US012393960B2

(12) United States Patent
Brunet

(10) Patent No.: US 12,393,960 B2
(45) Date of Patent: Aug. 19, 2025

(54) INCENTIVE-BASED ELECTRONIC MESSAGING SYSTEM

(71) Applicant: ADP, INC., Roseland, NJ (US)

(72) Inventor: Fred Brunet, Thousand Oaks, CA (US)

(73) Assignee: ADP, Inc., Roseland, NJ (US)

( * ) Notice: Subject to any disclaimer, the term of this patent is extended or adjusted under 35 U.S.C. 154(b) by 596 days.

(21) Appl. No.: 15/789,911

(22) Filed: Oct. 20, 2017

(65) Prior Publication Data
US 2019/0122241 A1   Apr. 25, 2019

(51) Int. Cl.
| | |
|---|---|
| G06Q 30/0214 | (2023.01) |
| G06Q 20/04 | (2012.01) |
| G06Q 20/16 | (2012.01) |
| G06Q 30/0201 | (2023.01) |
| G06Q 30/0207 | (2023.01) |
| H04L 9/32 | (2006.01) |
| H04W 12/106 | (2021.01) |
| G06Q 20/06 | (2012.01) |
| G06Q 30/0226 | (2023.01) |

(Continued)

(52) U.S. Cl.
CPC ....... *G06Q 30/0214* (2013.01); *G06Q 20/047* (2020.05); *G06Q 20/16* (2013.01); *G06Q 30/0201* (2013.01); *G06Q 30/0215* (2013.01); *G06Q 30/0225* (2013.01); *H04L 9/3239* (2013.01); *H04L 9/3247* (2013.01); *H04W 12/106* (2021.01); *G06Q 20/065* (2013.01); *G06Q 30/0226* (2013.01); *H04L 9/50* (2022.05); *H04L 63/08* (2013.01); *H04L 2209/56* (2013.01)

(58) Field of Classification Search
None
See application file for complete search history.

(56) References Cited

U.S. PATENT DOCUMENTS

| | | |
|---|---|---|
| 7,305,447 B2 | 12/2007 | Landesmann |
| 7,379,972 B2 | 5/2008 | Landesmann et al. |

(Continued)

OTHER PUBLICATIONS

Scharl, Arno, Astrid Dickinger, and Jamie Murphy, "Diffusion and success factors of mobile marketing." Electronic commerce research and applications 4.2 (2005): 159-173 (Year: 2005).*

(Continued)

*Primary Examiner* — Darlene Garcia-Guerra
(74) *Attorney, Agent, or Firm* — Foley & Lardner LLP

(57) ABSTRACT

A method, computer system, and computer program product for sending an electronic message using an incentive-based messaging system. The computer system identifies an incentive amount for the electronic message. The computer system reserves a proportional amount of currency from a sender's account. The proportional amount of currency is based on the incentive amount. In response to reserving the proportional amount of currency, the computer system attaches both the incentive amount and an authentication of the incentive amount to the electronic message. The computer system sends the electronic message to a recipient. A portion of the proportional amount of currency is transferred to a recipient's account in response to the recipient performing an action with respect to the electronic message. In response to transferring the portion of the currency to the account of the electronic message recipient, the computer system sends a payment receipt to a sender of the electronic message.

27 Claims, 13 Drawing Sheets

(51) Int. Cl.
*H04L 9/00* (2022.01)
*H04L 9/40* (2022.01)

(56) References Cited

U.S. PATENT DOCUMENTS

| | | | |
|---|---|---|---|
| 7,636,756 B2 | 12/2009 | Landesmann et al. | |
| 7,725,546 B2 | 5/2010 | Landesmann | |
| 7,962,561 B2 | 6/2011 | Landesmann | |
| 8,095,967 B2 | 1/2012 | Loesch et al. | |
| 8,271,002 B2 | 9/2012 | Shinya | |
| 9,042,921 B2 | 5/2015 | Karmarkar | |
| 10,546,326 B2* | 1/2020 | Publicover | H04N 1/25883 |
| 2002/0198942 A1* | 12/2002 | Ryan | G06Q 10/107 709/206 |
| 2003/0105666 A1* | 6/2003 | Taub | G06Q 30/0225 705/14.26 |
| 2003/0225694 A1* | 12/2003 | Algiene | G06Q 20/40 705/44 |
| 2003/0233418 A1* | 12/2003 | Goldman | G06Q 10/107 709/206 |
| 2005/0144244 A1 | 6/2005 | Landesmann | |
| 2005/0182735 A1* | 8/2005 | Zager | G06Q 20/04 705/67 |
| 2005/0192819 A1* | 9/2005 | Smith | G06Q 10/107 705/1.1 |
| 2005/0198176 A1 | 9/2005 | Landesmann | |
| 2005/0257045 A1* | 11/2005 | Bushman | G06Q 20/389 713/156 |
| 2006/0041505 A1* | 2/2006 | Enyart | H04L 51/00 705/40 |
| 2006/0080395 A1 | 4/2006 | Landesmann et al. | |
| 2006/0123083 A1 | 6/2006 | Goutte et al. | |
| 2006/0253597 A1 | 11/2006 | Mujica | |
| 2007/0073585 A1* | 3/2007 | Apple | G06Q 40/00 705/14.46 |
| 2007/0143407 A1* | 6/2007 | Avritch | G06Q 10/107 709/206 |
| 2007/0162339 A1* | 7/2007 | Arning | G06Q 10/107 705/14.1 |
| 2007/0192129 A1* | 8/2007 | Fortuna | G06Q 99/00 705/1.1 |
| 2007/0203836 A1* | 8/2007 | Dodin | G06Q 20/02 705/44 |
| 2007/0207780 A1* | 9/2007 | McLean | G06Q 30/02 455/414.1 |
| 2008/0071876 A1 | 3/2008 | Landesmann et al. | |
| 2008/0109306 A1* | 5/2008 | Maigret | G06F 21/10 705/14.46 |
| 2008/0228651 A1* | 9/2008 | Tapsell | G06Q 20/0655 705/65 |
| 2008/0233923 A1 | 9/2008 | Shinya | |
| 2009/0099961 A1* | 4/2009 | Ogilvy | G06Q 20/322 705/39 |
| 2009/0144194 A1 | 6/2009 | Dickelman | |
| 2009/0319368 A1* | 12/2009 | Reardon | G06Q 20/10 705/14.51 |
| 2009/0327928 A1* | 12/2009 | Dedis | G06F 3/0481 715/763 |
| 2010/0145702 A1 | 6/2010 | Karmarkar | |
| 2010/0161399 A1* | 6/2010 | Posner | G06Q 30/02 705/14.13 |
| 2010/0228831 A1 | 9/2010 | Landesmann | |
| 2011/0208653 A1 | 8/2011 | Landesmann | |
| 2011/0246273 A1* | 10/2011 | Yarvis | G06Q 30/02 705/14.19 |
| 2012/0158477 A1* | 6/2012 | Tennenholtz | G06Q 50/01 705/14.19 |
| 2013/0232061 A1 | 9/2013 | Gueron et al. | |
| 2013/0325572 A1* | 12/2013 | Plut | G06Q 30/0241 705/14.69 |
| 2014/0278869 A1* | 9/2014 | Wagner | G06Q 30/0215 705/14.17 |
| 2014/0279553 A1* | 9/2014 | Kassemi | G06Q 20/10 705/66 |
| 2015/0052055 A1* | 2/2015 | Kassemi | G06Q 20/12 705/44 |
| 2015/0100396 A1* | 4/2015 | Boury | G06Q 30/0229 705/14.3 |
| 2015/0106178 A1* | 4/2015 | Atazky | G06Q 30/0214 705/14.16 |
| 2016/0012469 A1* | 1/2016 | van Heerden | G06Q 20/387 705/14.27 |
| 2016/0253710 A1* | 9/2016 | Publicover | H04W 4/21 705/14.66 |
| 2017/0161734 A1* | 6/2017 | Bankston | G06Q 20/3829 |
| 2017/0206545 A1* | 7/2017 | Gupta | H04L 51/12 |
| 2017/0237554 A1* | 8/2017 | Jacobs | H04W 12/106 713/171 |
| 2017/0286951 A1* | 10/2017 | Ignatchenko | G06Q 20/3823 |
| 2017/0330159 A1* | 11/2017 | Castinado | G06Q 20/02 |
| 2017/0344994 A1* | 11/2017 | Wang | G06Q 50/01 |
| 2017/0364898 A1* | 12/2017 | Ach, II | G06Q 20/10 |
| 2017/0372417 A1* | 12/2017 | Gaddam | G06Q 20/06 |
| 2018/0068130 A1* | 3/2018 | Chan | G06F 21/6227 |
| 2018/0075453 A1* | 3/2018 | Durvasula | G06Q 20/4016 |
| 2019/0012695 A1* | 1/2019 | Bishnoi | G06Q 20/223 |
| 2019/0034888 A1* | 1/2019 | Grassadonia | G06Q 20/065 |
| 2019/0130484 A1* | 5/2019 | de Jong | G06Q 20/401 |
| 2019/0327218 A1* | 10/2019 | Altenhofen | H04L 63/061 |

OTHER PUBLICATIONS

Loder, Thede, Marshall Van Alstyne, and Rick Wash. "An economic answer to unsolicited communication." Proceedings of the 5th ACM Conference on Electronic Commerce. 2004 (Year: 2004).*
Kraut, Robert E., et al. "Pricing electronic mail to solve the problem of spam." Human-Computer Interaction 20.1-2 (2005): 195-223 (Year: 2005).*
Leiba, Barry, and Nathaniel S. Borenstein. "A Multifaceted Approach to Spam Reduction." CEAS. 2004 (Year: 2004).*

* cited by examiner

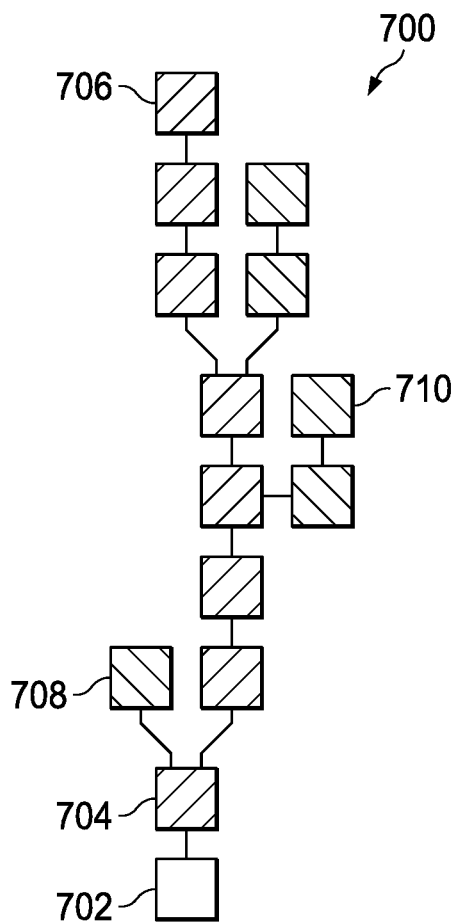
FIG. 7
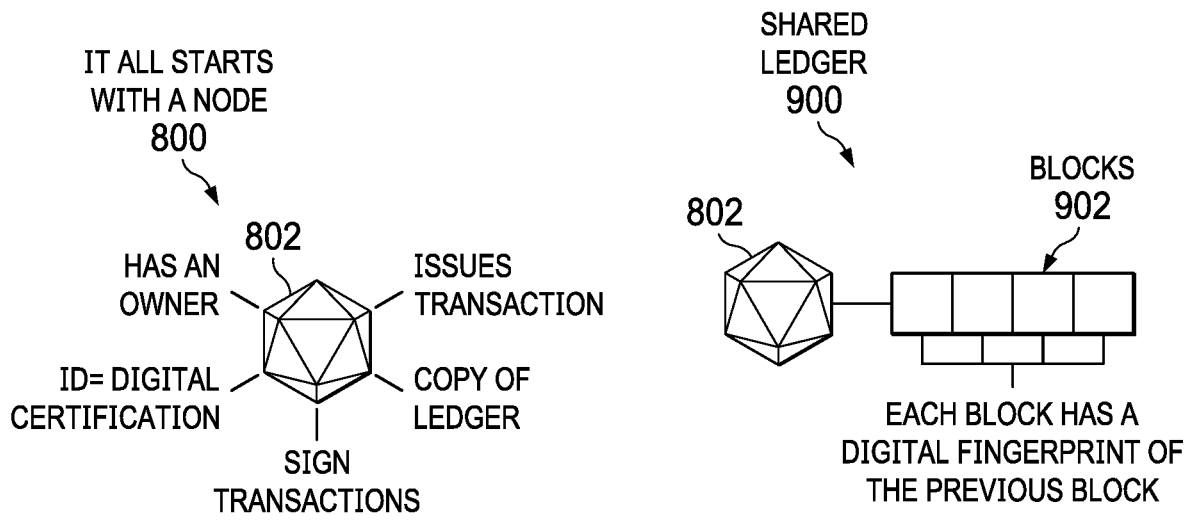
FIG. 8
FIG. 9

INCENTIVE-BASED ELECTRONIC MESSAGING SYSTEM

BACKGROUND INFORMATION

1. Field

The present disclosure relates to an improved computer system and, in particular, to a method and apparatus for an electronic messaging system using an incentive-based messaging system. Still more particularly, the present disclosure relates to a method and apparatus for an electronic messaging system that uses incentive-based messaging.

2. Background

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to other users through the Internet.

The use of e-mail messages is commonplace for personal and business use. E-mail messages are used by individuals to keep in touch with and communicate with other users. Additionally, e-mail messages provide a medium to collaborate and exchange documents. E-mail also provides a convenient channel for businesses to circulate advertisements, offers, incentives, and other communications to potential and existing clients.

Current electronic messages can be broadly categorized into one of two categories: 1) unsolicited e-mail or text; and 2) e-mail or text from known parties. Unfortunately for businesses, unsolicited electronic messages often go unseen by potential customers.

Users typically view unsolicited messages as undesirable clutter or garbage. Due to the proliferation of unsolicited messages, as well as the dangers posed by hidden viruses or unsafe executables, the majority of these unsolicited messages are discarded, regardless of their potential value to the recipient.

SUMMARY

An embodiment of the present disclosure provides a method for sending an electronic message using an incentive-based messaging system. The method comprises identifying, by a computer system, an incentive amount for the electronic message. The method further comprises reserving, by the computer system, a proportional amount of currency from a sender's account. The proportional amount of currency is based on the incentive amount. The method further comprises, in response to reserving the proportional amount of currency, attaching, by the computer system, both the incentive amount and an authentication of the incentive amount to the electronic message. The method further comprises sending the electronic message to a recipient. A portion of the proportional amount of currency is transferred to a recipient account in response to the recipient performing an action with respect to the electronic message. The method further includes, in response to transferring the portion of the currency to the recipient account, sending, by the computer system, a payment receipt to a sender of the electronic message.

Another embodiment of the present disclosure provides a computer system comprising a hardware processor and an incentive-based messaging system in communication with the hardware processor. The incentive-based messaging system is configured to identify and incentive amount for the electronic message. The incentive-based messaging system is further configured to reserve a proportional amount of currency from a sender's account. The proportional amount of currency is based on the incentive amount. The incentive-based messaging system is further configured to attach both the incentive amount and an authentication of the incentive amount to the electronic message in response to reserving the proportional amount of currency. The incentive-based messaging system is further configured to send the electronic message to a recipient. A portion of the proportional amount of currency is transferred to a recipient's account in response to the recipient performing an action with respect to the electronic message. The incentive-based messaging system is further configured to send a payment receipt to a sender of the electronic message in response to transferring the portion of the currency to the recipient account.

Yet another embodiment of the present disclosure provides a computer program product for sending an electronic message using an incentive-based messaging system. The computer program product comprises a computer readable storage media. Further, the computer program product comprises first program code, stored on the computer readable storage media, for reserving a proportional amount of currency from a sender's account. The proportional amount of currency is based on the incentive amount. Yet further, the computer program product comprises second program code, stored on the computer readable storage media, attaching both the incentive amount and an authentication of the incentive amount to the electronic message in response to reserving the proportional amount of currency. Still further, the computer program product comprises third program code, stored on the computer readable storage media, for sending the electronic message to a recipient. A portion of the proportional amount of currency is transferred to a recipient's account in response to the recipient performing an action with respect to the electronic message. Still yet further, the computer program product comprises fourth program code, stored on the computer readable storage media, for sending a payment receipt to a sender of the electronic message in response to transferring the portion of the currency to the recipient's account.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 7 is an illustration of a block diagram of a distributed ledger in the form of a blockchain in accordance with an illustrative embodiment;

FIG. 8 is an illustration of a block diagram illustrating a first step in creating a blockchain in accordance with an illustrative embodiment;

FIG. 9 is an illustration of a block diagram illustrating a second step in creating a blockchain in accordance with an illustrative embodiment;

DETAILED DESCRIPTION

The illustrative embodiments recognize and take into account one or more different considerations. For example, the illustrative embodiments recognize and take into account that existing e-mail systems may not be as effective as desired at distributing relevant content to a user.

For example, users typically view unsolicited messages as undesirable clutter or garbage. Due to the proliferation of unsolicited messages, as well as the dangers posed by hidden viruses or unsafe executables, the majority of these unsolicited messages are discarded, regardless of their potential value to the recipient.

Thus, the illustrative embodiments provide a method, an apparatus, and a computer program product for sending an electronic message using an incentive-based messaging system. In one illustrative example, a computer system that includes an incentive-based messaging system identifies an incentive amount for the electronic message. The computer system reserves a proportional amount of currency from a sender's account. The proportional amount of currency is based on the incentive amount. In response to reserving the proportional amount of currency, the computer system attaches both the incentive amount and an authentication of the incentive amount to the electronic message. The computer system sends the electronic message to a recipient. A portion of the proportional amount of currency is transferred to a recipient's account in response to the recipient performing an action with respect to the electronic message. In response to transferring the portion of the currency to the account of the electronic message recipient, the computer system sends a payment receipt to a sender of the electronic message.

Figure 1:
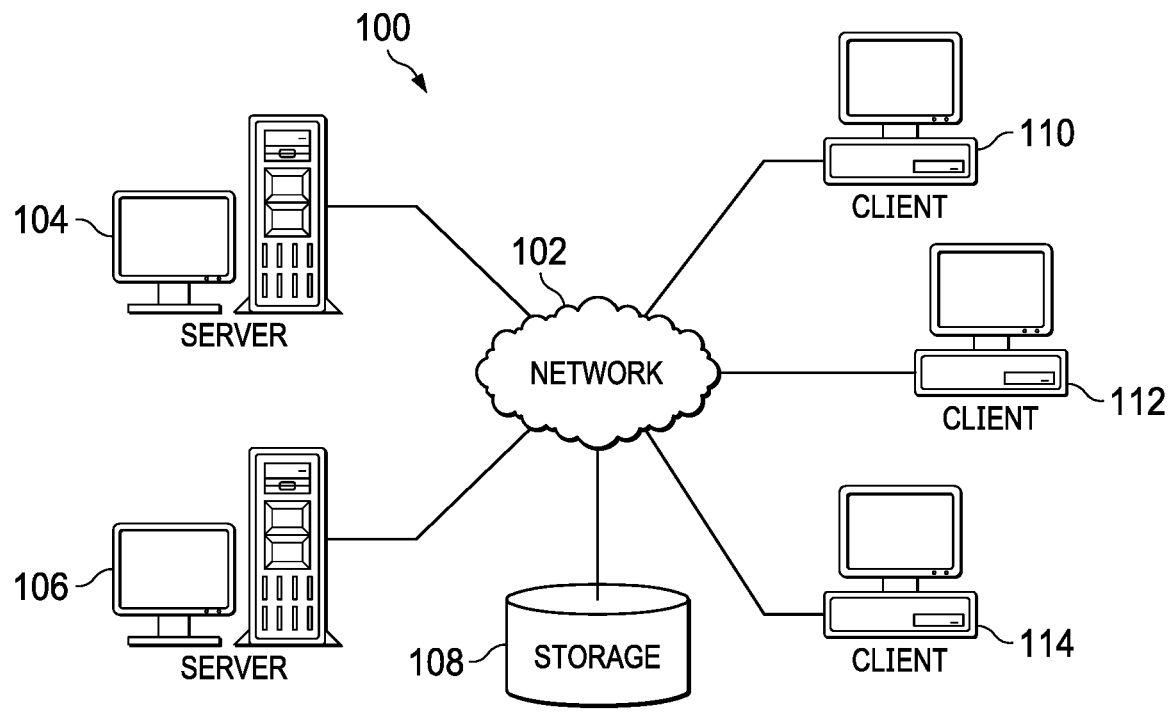
FIG. 1 is an illustration of a diagram of a network data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
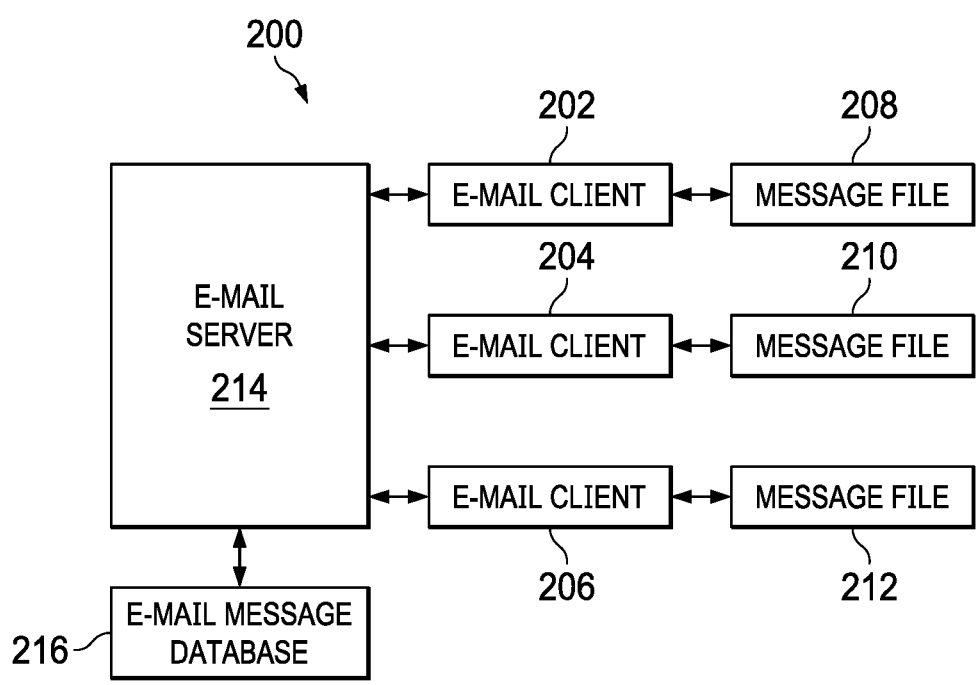
FIG. 2 is an illustration of a block diagram of an e-mail messaging system in accordance with an illustrative embodiment.

Turning now to FIG. 2, an illustration of a block diagram illustrating an e-mail messaging system is depicted in accordance with an illustrative embodiment. In this example, e-mail messaging system 200 includes e-mail client 202, e-mail client 204, and e-mail client 206, which are programs or applications located at different client data processing systems, such as client computer 110, client computer 112, and client computer 114 in FIG. 1. Message file 208, message file 210, and message file 212 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 2 (POP2) or post office protocol 3 (POP3), also may be employed.

These e-mail programs are used to send e-mails back and forth to different users through e-mail server 214. Messages sent to other e-mail clients are stored in e-mail message database 216. When an e-mail client connects to e-mail server 214, any messages for that particular client are then sent to the client. E-mail client 202, 204, and 206 may be implemented using presently available e-mail clients.

Figure 3:
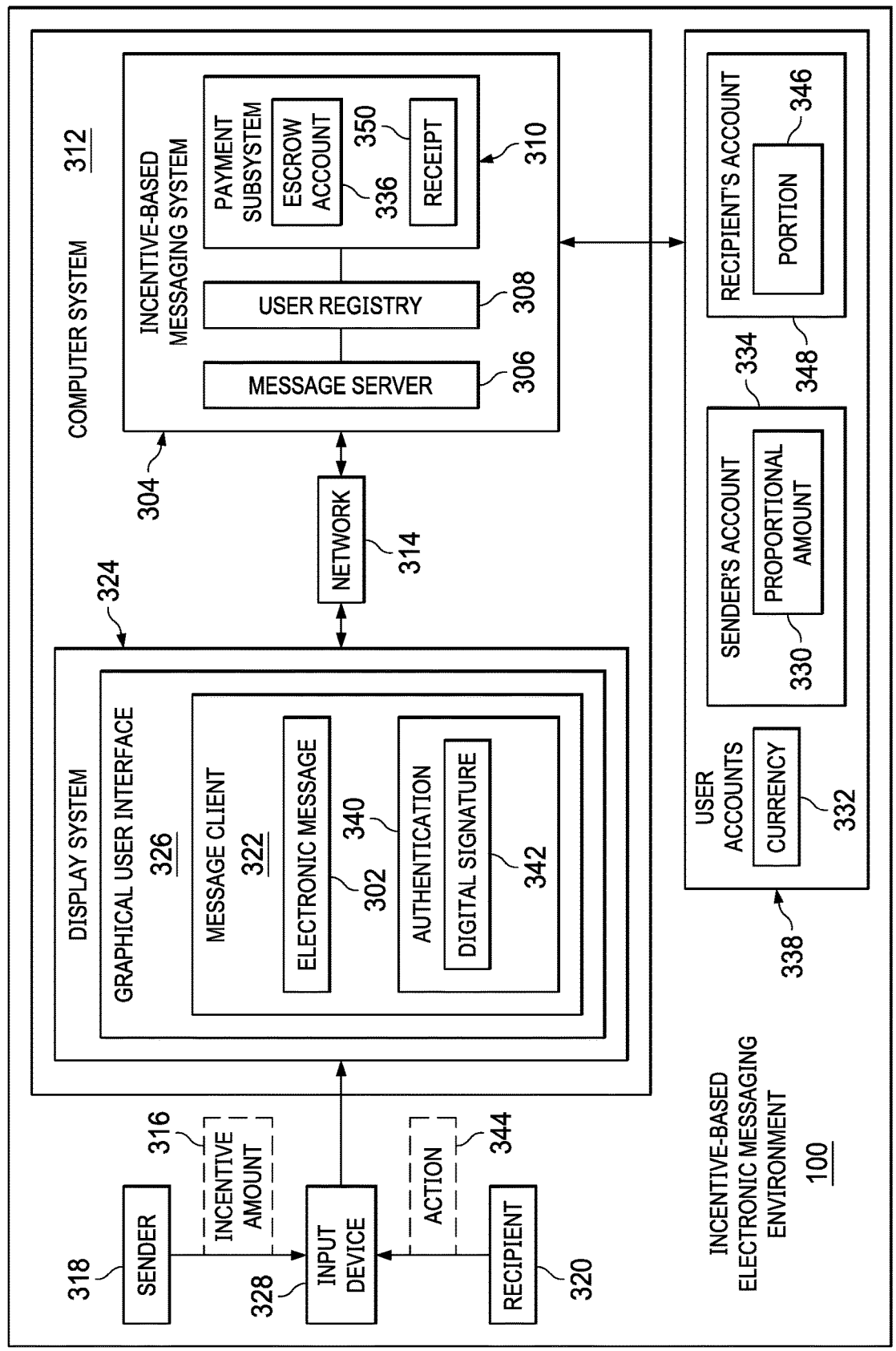
FIG. 3 is an illustration of a block diagram of an incentive-based electronic messaging environment in accordance with an illustrative embodiment.

With reference next to FIG. 3, an illustration of a block diagram of an incentive-based electronic messaging environment is depicted in accordance with an illustrative embodiment. In this depicted example, incentive-based electronic messaging environment 300 allows users to send and receive electronic message 302 through incentive-based messaging system 304. In this illustrative example, incentive-based messaging system 304 includes a number of different components. As depicted, incentive-based messaging system 304 includes message server 306, user registry 308, and payment subsystem 310. Incentive-based messaging system 304 may be implemented in computer system 312.

Computer system 312 is a physical hardware system and includes one or more data processing systems. When more than one data processing system is present, those data processing systems may be in communication with each other using a communications medium. The communications medium may be a network, such as network 314. The data processing systems may be selected from at least one of a computer, a server computer, a workstation, a tablet computer, a laptop computer, a mobile phone, or some other suitable data processing system.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Incentive-based messaging system 304 may be implemented in software, hardware, firmware, or a combination thereof. When software is used, the operations performed by incentive-based messaging system 304 may be implemented in program code configured to run on hardware, such as a processor unit. When firmware is used, the operations performed by incentive-based messaging system 304 may be implemented in program code and data and stored in persistent memory to run on a processor unit. When hardware is employed, the hardware may include circuits that operate to perform the operations in incentive-based messaging system 304.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Incentive-based messaging system 304 provides a system and method to encrypt electronic message 302 along with incentives provided by sender 318. Furthermore, incentive-based electronic messaging system 304 provides a system and method to decrypt electronic message 302 and to process payment of incentives to recipient 320. These systems and methods can be implemented by one or more of message server 306, payment subsystem 310, and message client 322.

Incentive-based messaging system 304 includes message server 306. Message server 306 is an application that receives electronic message 302 from sender 318 and forwards electronic message 302 for delivery to recipient 320. Message server 306 can be an implementation of e-mail server 214 of FIG. 2. Alternatively, message server 306 system may be implemented as a separate message server, distinct from a traditional e-mail server, which exclusively manages electronic message 302 for incentive-based messaging system 304. When message server 306 is a separate message server, message server 306 prevents electronic message 302 from being filtered and discarded as unsolicited bulk email, as may otherwise occur when using a traditional e-mail server.

Incentive-based messaging system 304 identifies incentive amount 316 for electronic message 302. Incentive amount 316 is a remittance from sender 318 to recipient 320. Incentive amount 316 provides an incentive for recipient 320 to view electronic message 302. As such, incentive amount 316 directly encourages recipient 320 to review electronic message 302. Furthermore, incentive amount 316 also conveys to recipient 320 a perceived worth of electronic message 302 as perceived by sender 318.

In one illustrative example, incentive-based messaging system 304 identifies incentive amount 316 based on interaction of sender 318 with message client 322, displayed on display system 324 in graphical user interface 326. An operator, such as sender 318, may interact with graphical user interface 326 through user input generated by one or more of user input device 328, such as, for example, a mouse, a keyboard, a trackball, a touchscreen, a stylus, or some other suitable type of input device.

In one illustrative example, message client 322 is one or more programs or applications, such as e-mail clients 202, 204, and 206 of FIG. 2, located at one or more client data processing systems, such as client computer 110, client computer 112, and client computer 114 in FIG. 1. Message client 322 allows users to create, send, receive, and view electronic message 302. Additionally, message client 322 allows sender 318 to indicate incentive amount 316 for electronic message 302.

In one illustrative example, message client 322 may be implemented using presently available e-mail clients augmented with one or more software components, plugins, add-ins, or extensions that enable the transfer of electronic message 302 over incentive-based messaging system 304, as well as the attachment, receipt, and previewing of incentive amount 316. In another illustrative example, message client 322 may be implemented as a standalone electronic messaging client for transferring electronic message 302 over incentive-based messaging system 304.

Message client 322 is displayed in graphical user interface 326 on display system 324. In this illustrative example, display system 324 can be a group of display devices. A display device in display system 324 may be selected from one of a liquid crystal display (LCD), a light emitting diode (LED) display, an organic light emitting diode (OLED) display, and other suitable types of display devices.

In response to identifying incentive amount 316 for electronic message 302, incentive-based messaging system 304 reserves proportional amount 330 of currency 332 from sender's account 334. Incentive-based messaging system 304 determines proportional amount 330 of currency 332 based on incentive amount 316.

In this illustrative example, proportional amount 330 is an amount of currency 332 sufficient to compensate recipient 320. For example, if sender 318 indicates only one recipient of electronic message 302, proportional amount 330 may be equivalent to incentive amount 316. However, if sender 318 indicates multiple recipients of electronic message 302, proportional amount 330 may be equivalent to a corresponding multiple of incentive amount 316.

Currency 332 is a medium of exchange for compensating recipient 320. In an illustrative example, currency 332 can be selected from a physical currency, an electronic currency, a virtual currency, a reward point currency, or any other suitable form of currency for providing compensation to recipient 320.

In this illustrative example, incentive-based messaging system 304 reserves proportional amount 330 of currency 332 by transferring proportional amount 330 from sender's account 334 to escrow account 336 of payment subsystem 310. For example, incentive-based messaging system 304 may identify sender's account 334 from a number of different user accounts 338 as indicated in user registry 308. User accounts 338 can be accounts specific to incentive-based messaging system 304. Alternatively, user accounts 338 may be accounts maintained by a third-party for the benefit of the user, such as a credit card account, a bank account, a PayPal account, or some other suitable type of account of currency 332.

In response to reserving proportional amount 330 of currency 332, both incentive amount 316 and authentication 340 of incentive amount 316 are attached to electronic message 302. Incentive amount 316 is attached to electronic message 302 in a manner that allows message client 322 to determine and display incentive amount 316 for electronic message 302 notwithstanding any action by recipient 320. As a result, message client 322 can display, sort, and manage electronic message 302 according to incentive amount 316.

Authentication 340 is an attestation to the veracity of incentive amount 316. Authentication 340 can be, for example, digital signature 342. Digital signature 342 can be a digital signature of at least one of sender 318 and payment subsystem 310. Because authentication 340 is attached to electronic message 302, separate from incentive amount 316, message client 322 can determine the veracity of incentive amount 316 based on authentication 340. Recipient 320 can therefore rely on the veracity of incentive amount 316 as attached to electronic message 302 and displayed by message client 322.

In one illustrative example, authentication 340 is generated in response to reserving proportional amount 330 of currency 332 from sender's account 334. In response to generating authentication 340, authentication 340 can be automatically attached to electronic message 302.

After attaching both incentive amount 316 and authentication 340 to electronic message 302, electronic message 302 is sent to recipient 320. Message client 322 can determine and display incentive amount 316 for electronic message 302. As a result, message client 322 can display, sort, and manage electronic message 302 according to incentive amount 316 notwithstanding action 344 by recipient 320.

In this illustrative example, action 344 is an interaction of recipient 320 with electronic message 302 in message client 322, displayed on display system 324 in graphical user interface 326. Recipient 320 may perform action 344 by interacting with graphical user interface 326 through user input generated by user input device 328. In an illustrative example, action 344 can be at least one of opening electronic message 302, scrolling to a predetermined section of electronic message 302, opening an attachment attached to electronic message 302, forwarding electronic message 302 to a subsequent recipient, as well as some other suitable types of action that can be performed with respect to electronic message 302.

In response to recipient 320 performing action 344 with respect to electronic message 302, incentive-based messaging system 304 transfers portion 346 of proportional amount 330 of currency 332 to recipient's account 348. In this manner, incentive-based messaging system 304 provides compensation to recipient 320 for performing action 344 with respect to electronic message 302 in the form of proportional amount 330.

In this illustrative example, portion 346 can be a part of or all of proportional amount 330. Portion 346 can correspond to incentive amount 316 indicated in electronic message 302. Incentive-based messaging system 304 can transfer portion 346 to recipient's account 348 by transferring portion 346 from escrow account 336 of payment subsystem 310.

In response to transferring portion 346 to recipient's account 348, incentive-based messaging system 304 generates and sends receipt 350 to sender 318. In this manner, incentive-based messaging system 304 provides sender 318 with a record showing that recipient 320 has accepted compensation for performing action 344 with respect to electronic message 302.

Thus, the illustrative embodiments provide a method, an apparatus, and a computer program product for sending an electronic message using an incentive-based messaging system. Sending an electronic message using an incentive-based messaging system allows the sender to attach a payment incentive with the message. The recipient can view the attached amount before opening the message, which can be prioritized within the message client according to the attached amount. The incentive payment is received only when the recipient performs an action with respect to the message, such as opening or reading the message.

In this manner, the incentive-based messaging system provides a secure alternative to traditional e-mail. The incentive-based messaging system provides storage and encryption of the electronic messages, as well as the user interactions and incentive amounts. The incentive-based messaging system allows micro-payments from a message sender in the form of an incentive, which is held in an escrow account separate from the electronic message. The incentive-based messaging system keeps the incentive amounts separate from the message text to prevent spoofing by the message sender or interception by outside parties. The incentive amounts can be encrypted, together along with any required transaction keys, and provided to the users in the form of a distributed ledger.

In this manner, the use of the incentive-based messaging system has a technical effect of incentivizing an electronic message to overcome a problem that is particular to computer systems, thereby allowing the sender of an electronic message to ensure visibility and penetration of an electronic message to one or more message recipients. In this manner, distributing relevant information to message recipients may be performed more efficiently as compared to currently used systems that do not include the incentive-based messaging system.

As a result, a computer system that includes incentive-based messaging system operates as a special purpose computer system. For example, when the computer system uses the incentive-based messaging system to send an electronic message, the computer system identifies an incentive amount for the electronic message. The computer system reserves a proportional amount of currency from a sender's account. The proportional amount of currency is based on the incentive amount. In response to reserving the proportional amount of currency, the computer system attaches both the incentive amount and an authentication of the incentive amount to the electronic message. The computer system sends the electronic message to a recipient. A portion of the proportional amount of currency is transferred to a recipient's account in response to the recipient performing an action with respect to the electronic message. In response to transferring the portion of the currency to the account of the electronic message recipient, the computer system sends a payment receipt to a sender of the electronic message.

Thus, the incentive-based messaging system transforms a computer system into a special purpose computer system as compared to currently available general computer systems that do not have an incentive-based messaging system, such as incentive-based messaging system 304 of FIG. 3. Currently used general computer systems do not reduce the time or effort needed to distributing relevant information to one or more message recipients and ensure visibility and penetration of the electronic message to the recipients.

Figure 4:
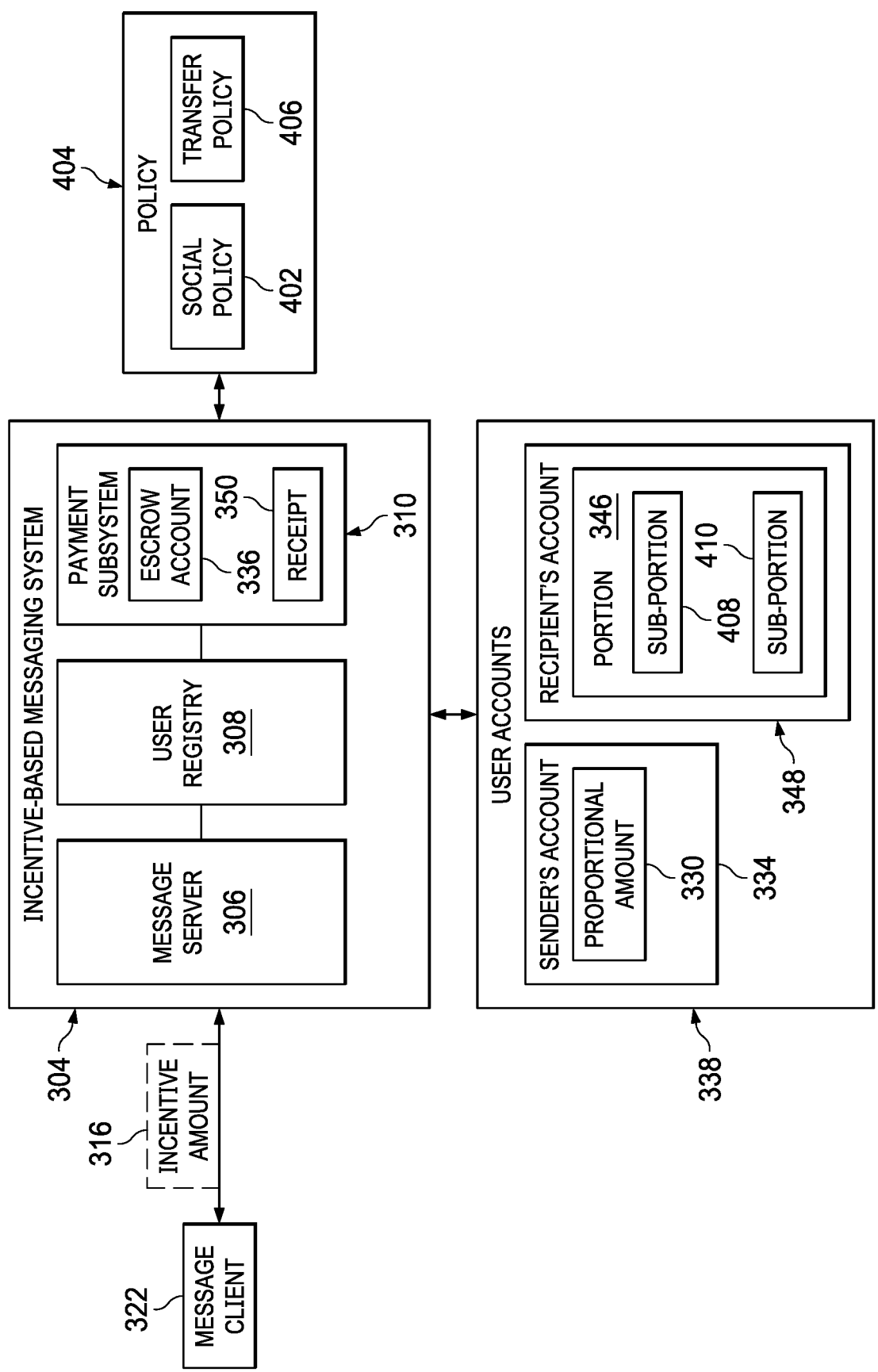
FIG. 4 is an illustration of a block diagram of a data flow for identifying an incentive according to an incentive policy in accordance with an illustrative embodiment.

With reference next to FIG. 4, an illustration of a block diagram of a data flow for identifying an incentive according to one or more policies is depicted in accordance with an illustrative embodiment.

In this illustrative example, incentive-based messaging system 304 identifies recipient 320 within user registry 308. In this example, user registry 308 is a registry of verified users that provides additional assurances as to the identity of recipient 320. For example, as part of a registration process, users of incentive-based messaging system 304, including recipient 320, may be required to provide evidence as to their identity. In one illustrative example, this evidence can be provided through a manual vetting process, or a federated identity system having the requisite level of veracity as to the identity of its users.

Having been provided with adequate assurances of the identity of recipient 320, incentive-based messaging system 304 can determine a relative social influence or relative social prominence of recipient 320. In this illustrative example, social influence is the ability of recipient 320 to influence or alter a behavior in another person based on a relationship with recipient 320. Social prominence is a state of being well-known or famous.

In this illustrative example, incentive-based messaging system 304 determines incentive amount 316 based on social policy 402 of policy 404. Policy 404 is a group of rules and may also include data for applying those rules. In this illustrative example, social policy 402 is a rule for determining incentive amount 316 based on the relative social influence or relative social prominence of recipient 320.

For example, social policy 402 may include rules on identifying the relative social influence or relative social prominence. Incentive-based messaging system 304 can determine a relative social influence or relative social prominence of recipient 320 from, for example, a number of followers, friends, and relationships of recipient 320 within an online social network. These rules in social policy 402 specify a degree of influence or prominence of recipient 320. For example, social policy 402 may be applied to a social network profile of recipient 320 to determine a relative social influence or prominence of recipient 320 based on the number of followers, friends, and relationships of recipient 320 within the online social network.

Additionally, incentive-based messaging system 304 may use social policy 402 to identify incentive amount 316 for recipient 320. For example, incentive-based messaging system 304 may determine incentive amount 316 relative to a measure of social influence or prominence of recipient 320.

In another illustrative example, incentive-based messaging system 304 identifies transfer policy 406 of policy 404. In this illustrative example, transfer policy 406 is one or more rules for determining proportional amount 330 and conditions placed upon action 344. In this illustrative example, when incentive-based messaging system 304 reserves proportional amount 330 of currency 332 from sender's account 334, proportional amount 330 is based on both incentive amount 316 and transfer policy 406.

For example, transfer policy 406 may include rules that delineate a total amount of currency 332 to be transferred from sender's account 334. For example, sender 318 may desire to widely distribute electronic message 302. In this illustrative example, transfer policy 406 provides an indirect limit to a number of message recipients, such that proportional amount 330 does not exceed an amount of currency 332 indicated by transfer policy 406.

As a further example, transfer policy 406 may include rules that delineate a number of e-mail recipients to which portion 346 can be transferred. For example, sender 318 may wish to limit the number of recipients receiving portion 346. In this illustrative example, transfer policy 406 limits the award of portion 346 to a predetermined number of recipients as indicated by transfer policy 406.

As yet another example, transfer policy 406 may include rules that delineate an amount of time during which recipient 320 can perform action 344 with respect to electronic message 302. For example, electronic message 302 may contain time-sensitive information or offers. In this illustrative example, transfer policy 406 limits the amount of time, as indicated in transfer policy 406, during which portion 346 is awarded to recipient 320 for performing action 344.

As yet another example, transfer policy 406 may include rules indicating whether action 344 is transferable from recipient 320 by forwarding electronic message 302 to a subsequent recipient. For example, sender 318 may desire to widely distribute electronic message 302, and may not be concerned with the identity of whom performs action 344. In this illustrative example, transfer policy 406 may indicate that electronic message 302 is transferable from recipient 320 by forwarding electronic message 302 to a subsequent recipient. Conversely, due to the content or nature of electronic message 302, sender 318 may desire to limit electronic message 302 only to sender 318. In this illustrative example, transfer policy 406 may indicate that electronic message 302 is not transferable from recipient 320 by forwarding electronic message 302 to a subsequent recipient.

Additionally, transfer policy 406 may include rules indicating sub-portion 408 and sub-portion 410. Sub-portion 408 is an amount of portion 346 that is allocated to recipient 320 in response to performance of action 344 by a subsequent recipient to whom recipient 320 has forwarded electronic message 302. Sub-portion 410 is an amount of portion 346 that is allocated to a subsequent recipient in response to performance of action 344 by the subsequent recipient to whom recipient 320 has forwarded electronic message 302.

Figure 5:
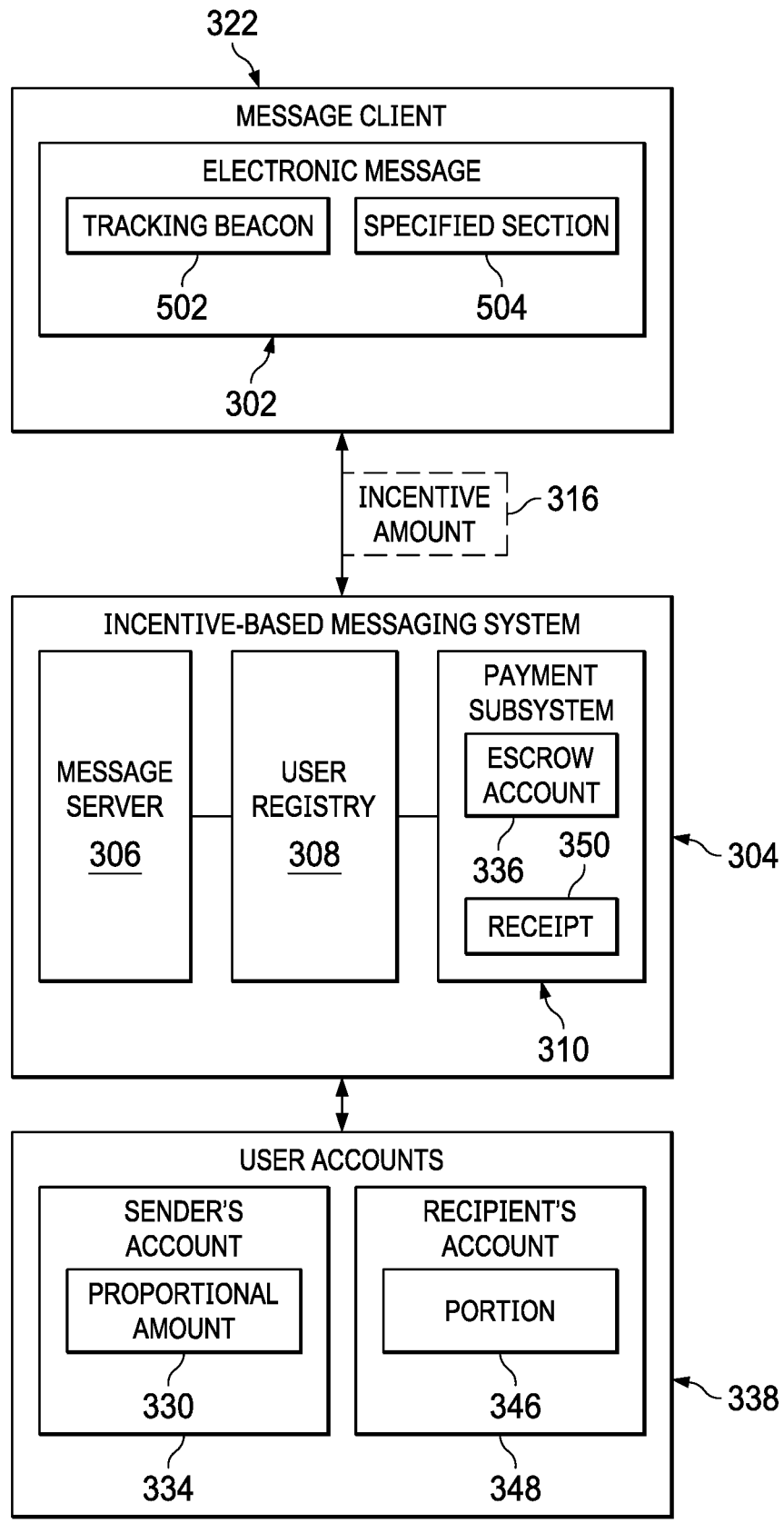
FIG. 5 is an illustration of a block diagram of a data flow for tracking a user's acceptance of an incentive in accordance with an illustrative embodiment.

With reference next to FIG. 5, an illustration of a block diagram of a data flow for tracking a user's acceptance of an incentive is depicted in accordance with an illustrative embodiment. In this illustrative example, incentive-based messaging system 304 transfers proportional amount 330 of currency 332 from sender's account 334 to escrow account 336. Incentive-based messaging system 304 then generates tracking beacon 502 for electronic message 302 that identifies escrow account 336. Tracking beacon 502 is inserted at specified section 504 of electronic message 302.

For example, tracking beacon 502 may be an embedded object, such as a single-pixel gif, within the content of electronic message 302. When recipient 320 performs action 344, tracking beacon 502 is referenced, thus enabling incentive-based message system 304 to determine the performance of action 344 by recipient 320.

Figure 6:
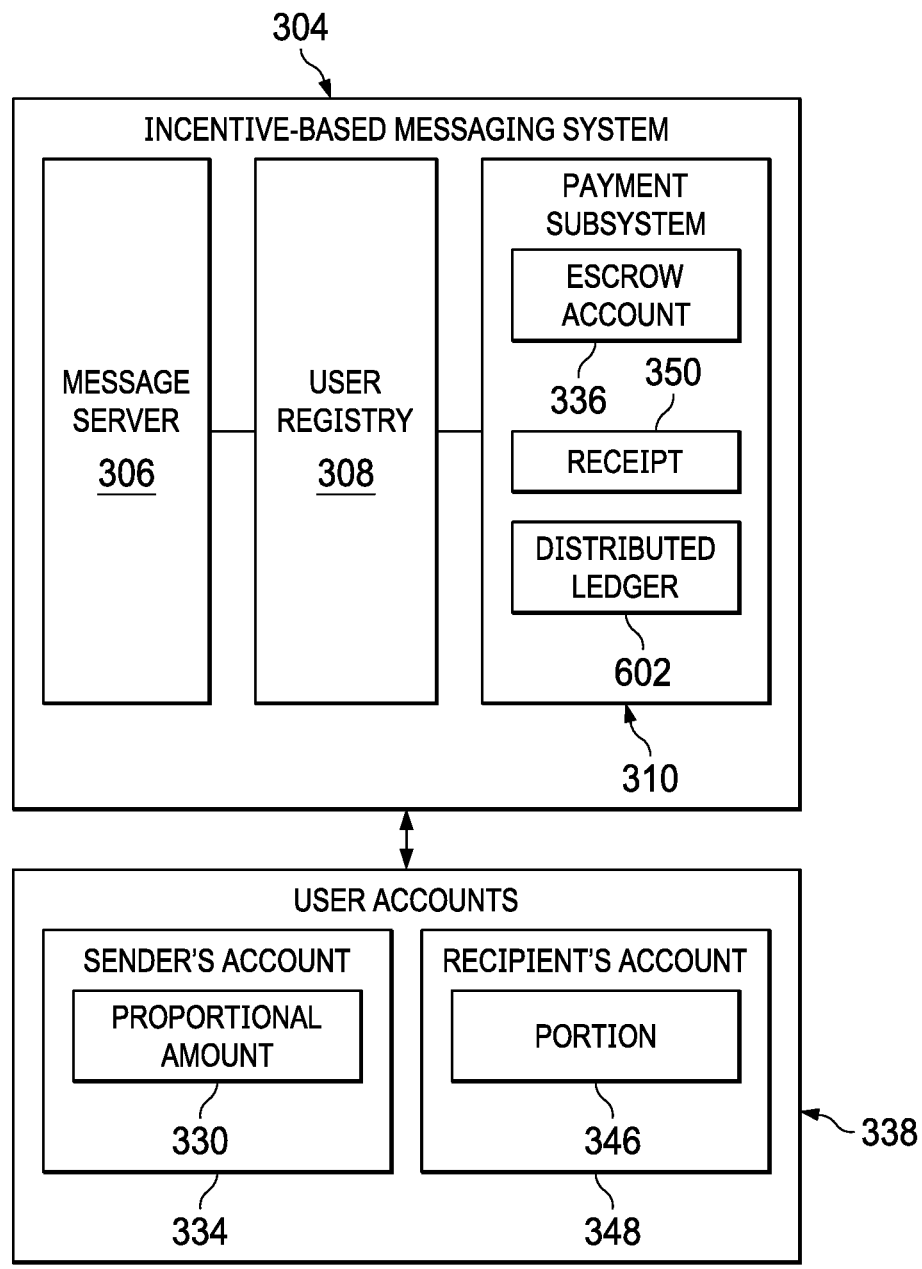
FIG. 6 is an illustration of a block diagram of a data flow for managing message incentives and tracking a user's acceptance of an incentive in a distributed ledger in accordance with an illustrative embodiment.

With reference next to FIG. 6, an illustration of a block diagram of a data flow for managing message incentives and tracking a user's acceptance of an incentive in a distributed ledger is depicted in accordance with an illustrative embodiment. In this illustrative example, when proportional amount 330 is reserved within escrow account 336, payment subsystem 310 generates distributed ledger 602 corresponding to electronic message 302. As used herein, a distributed ledger is a replicated data structure that is shared and synchronized digital data that enables the distributed recordation of transactions by a network of computers. Distributed ledger 602 is a distributed ledger that enables the distributed recordation of transactions relating to electronic message 302 by sender 318 and recipient 320. Distributed ledger 602 can be, for example, a blockchain.

Distributed ledger 602 is specific to electronic message 302. In one illustrative example, incentive-based messaging system 304 maintains separate distributed ledgers for each electronic message having an incentive amount attached thereto.

After generating distributed ledger 602, payment subsystem 310 indicates the transfer of proportional amount 330 of currency 332 from sender's account 334 to escrow account 336 in distributed ledger 602. In this manner, distributed ledger 602 provides recipient 320 with assurance that proportional amount 330 has been reserved in escrow account 336.

When recipient 320 performs action 344 with respect to electronic message 302, performance of action 344 by recipient 320 is indicated in distributed ledger 602. In this manner, distributed ledger 602 provides sender 318 with assurance that recipient 320 has performed action 344.

When payment subsystem 310 transfers portion 346 of proportional amount 330 from escrow account 336 to recipient's account 348, the transfer is indicated in distributed ledger 602. In this manner, distributed ledger 602 provides sender 318 and recipient 320 with assurance that portion 346 has been transferred from escrow account 336 to recipient's account 348.

When payment subsystem 310 generates receipt 350, the generation of receipt 350 is indicated in distributed ledger 602. In this manner, distributed ledger 602 provides sender 318 with assurance of the transaction. Thereafter, payment subsystem 310 can close distributed ledger 602.

With reference next to FIG. 7, an illustration of a distributed ledger in the form a blockchain is depicted in accordance with an illustrative embodiment. Blockchain 700 is a blockchain, which is a specific implementation of distributed ledger 602 of FIG. 6. Blockchain 700 is described to introduce blockchain concepts.

Blockchain 700 starts with genesis block 702. Blocks indicated with a right-leaning hash, such as block 704 or block 706, are part of the main chain. Blocks with a left-leaning hash, such as block 708 or block 710, exist outside of blockchain 700.

Stated more formally, a blockchain is a distributed database that maintains a continuously growing list of ordered records called blocks. Each block contains a timestamp and a link to a previous block, with the hash of the prior block linking the two. By design, blockchains are inherently resistant to modification of data because, once recorded, the data in a block cannot be altered retroactively. Through the use of a peer-to-peer network and one or more distributed timestamping servers, a blockchain database may be managed autonomously. Thus, blockchains may be used to provide an open, distributed ledger that can record transactions between parties efficiently and in a verifiable and permanent way.

Distributed ledgers, and blockchains in particular, are secure by design. Blockchains have a high byzantine fault tolerance. Thus, a decentralized consensus can be achieved with a blockchain. The first blockchain was created by Satoshi Nakamoto in 2008 and implemented the following year as a core component of the digital currency BITCOIN®, where it serves as the public ledger for all transactions. BITCOIN® was the first digital currency to solve the double spending problem, without the use of a trusted authority or central server.

Figure 10:
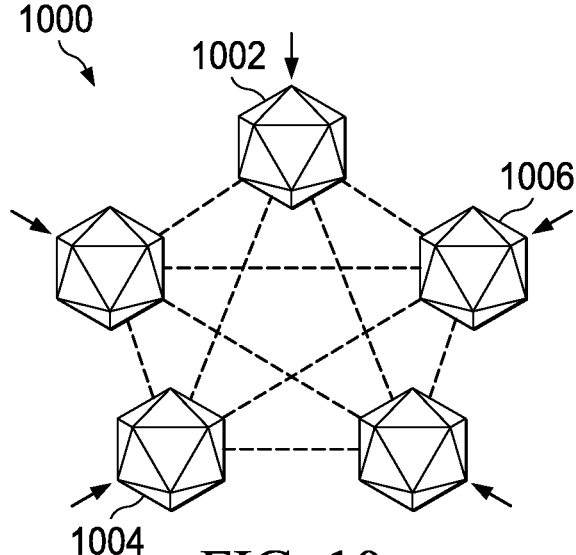
FIG. 10 is an illustration of a block diagram illustrating a third step in creating a blockchain in accordance with an illustrative embodiment.
Figure 11:
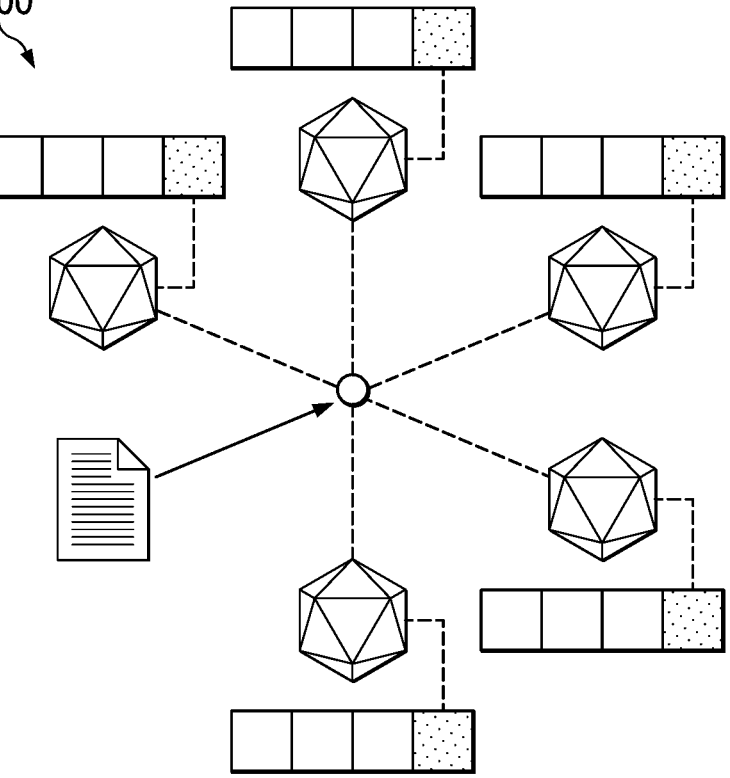
FIG. 11 is an illustration of a block diagram illustrating a fourth step in creating a blockchain in accordance with an illustrative embodiment.
Figure 12:
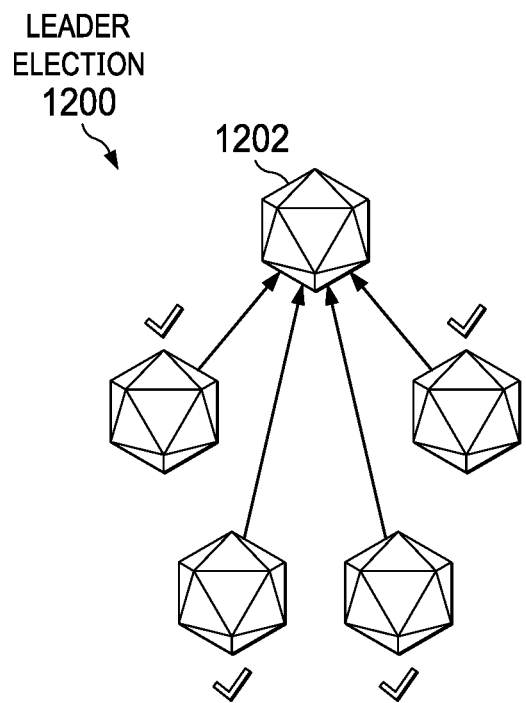
FIG. 12 is an illustration of a block diagram illustrating a fifth step in creating a blockchain in accordance with an illustrative embodiment.
Figure 13:
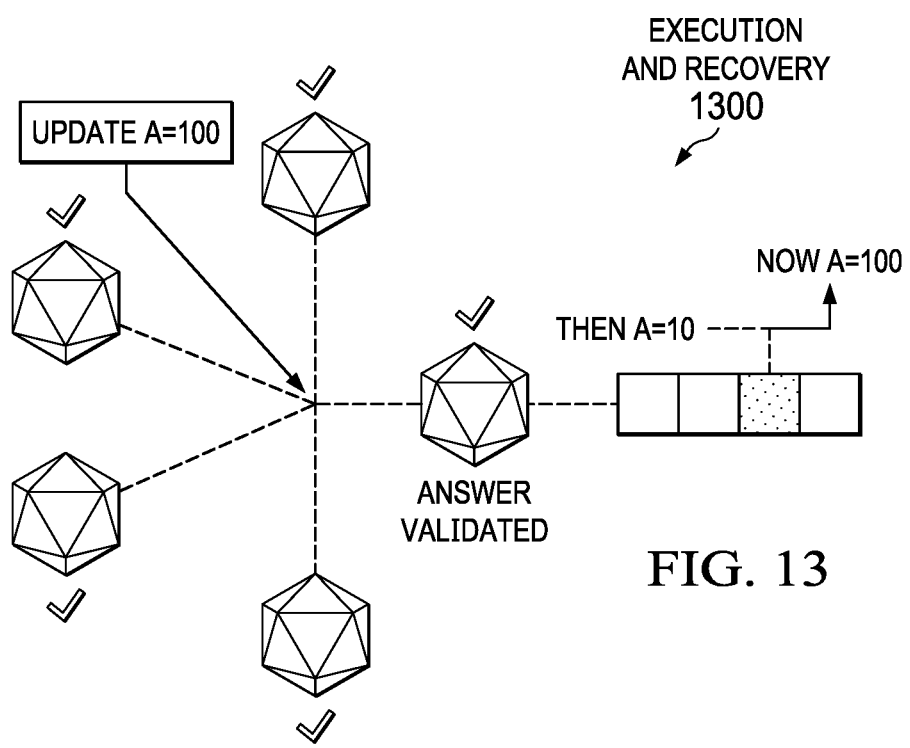
FIG. 13 is an illustration of a block diagram illustrating a sixth step in creating a blockchain in accordance with an illustrative embodiment.

FIG. 8 through FIG. 13 should be considered together. FIG. 8 is a block diagram illustrating a first step in creating a blockchain in accordance with an illustrative embodiment. FIG. 9 is a block diagram illustrating a second step in creating a blockchain in accordance with an illustrative embodiment. FIG. 10 is a block diagram illustrating a third step in creating a blockchain in accordance with an illustrative embodiment. FIG. 11 is a block diagram illustrating a fourth step in creating a blockchain in accordance with an illustrative embodiment. FIG. 12 is a block diagram illustrating a fifth step in creating a blockchain in accordance with an illustrative embodiment. FIG. 13 is a block diagram illustrating a sixth step in creating a blockchain in accordance with an illustrative embodiment. FIGS. 8-13 may be implemented on a computer or on multiple computers in a network environment. FIGS. 8-13 address a technical problem that only exists in computer programming and execution. As used throughout FIGS. 8-13, common reference numerals refer to common objects in these figures.

In operation 800 shown in FIG. 8, node 802 is created which contains initial data for a distributed ledger. Node 802 includes an owner, a digital certificate identification, and a copy of a ledger. Node 802 may issue transactions. Node 802 may sign transactions.

In operation 900 shown in FIG. 9, blocks 902 are added to node 802. Each block in the shared ledger has a digital fingerprint of the previous block. In this manner, it is not possible to alter previous blocks without being detected.

In operation 1000 shown in FIG. 10, blockchain network 1002 is formed. Blockchain network 1002 may include multiple blockchains such as those shown in FIGS. 8-9. Each blockchain has its own node, such as node 1004 or node 1006. In operation 1100 shown in FIG. 11, transactions and distributions are added to the various nodes. Thus, blocks are added to each node.

In operation 1200 shown in FIG. 12, leader election takes place. In this operation, leader node 1202 is elected. Leader node 1202 takes priority for deciding which information is the most accurate or up-to-date.

In operation 1300 shown in FIG. 13, data execution and recovery takes place. A query regarding data stored in one or more of the nodes may return a validated answer regarding contents in the blocks.

These digitally recorded "blocks" of data are stored in a linear chain. Each block in the chain contains data indicating a transaction with respect to electronic message 302, such as transfer of proportional amount 330, performance of action 344, and transfer of portion 346. Each block is cryptographically hashed. The blocks of hashed data draw upon the previous block which came before it in the chain, ensuring all data in the overall blockchain has not been tampered with and remains unchanged.

Figure 14:
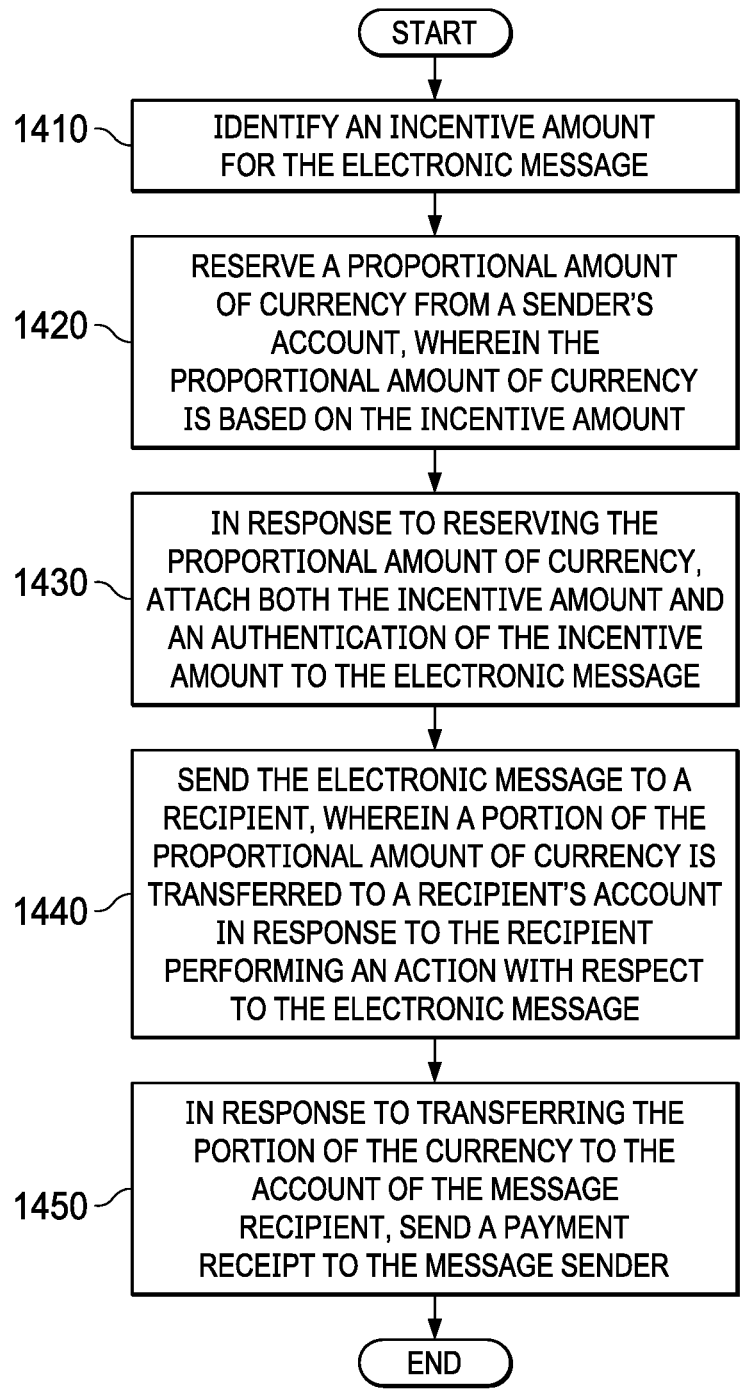
FIG. 14 is an illustration of a flowchart of a process for sending an electronic message using an incentive-based messaging system in accordance with an illustrative embodiment.

With reference next to FIG. 14, an illustration of a flowchart of a process for sending an electronic message using an incentive-based messaging system is depicted in accordance with an illustrative embodiment. Process 1400 may be implemented in computer system 312 of FIG. 3. For example, process 1400 may be implemented as operations performed by incentive-based messaging system 304, shown in block form in FIG. 3.

The process begins by identifying an incentive amount for the electronic message (step 1410). The incentive amount can be incentive amount 316 for electronic message 302, both shown in FIG. 3.

The process then reserves a proportional amount of currency from a sender's account (step 1420). The proportional amount of currency is based on the proportional amount.

In response to reserving the proportional amount of currency, the process attaches both the incentive amount and an authentication of the incentive amount to the electronic message (step 1430). The authentication can be authentication 340 in the form of digital signature 342, both of FIG. 3.

The process then sends the electronic message to a recipient (step 1440). In response to the recipient performing an action, such as action 344 of FIG. 3, with respect to the electronic message, a proportion of the proportional amount of currency is transferred to the recipient's account. In response to transferring the portion of currency to the recipient's account, the process sends a receipt to the sender (step 1450), with the process terminating thereafter.

Figure 15:
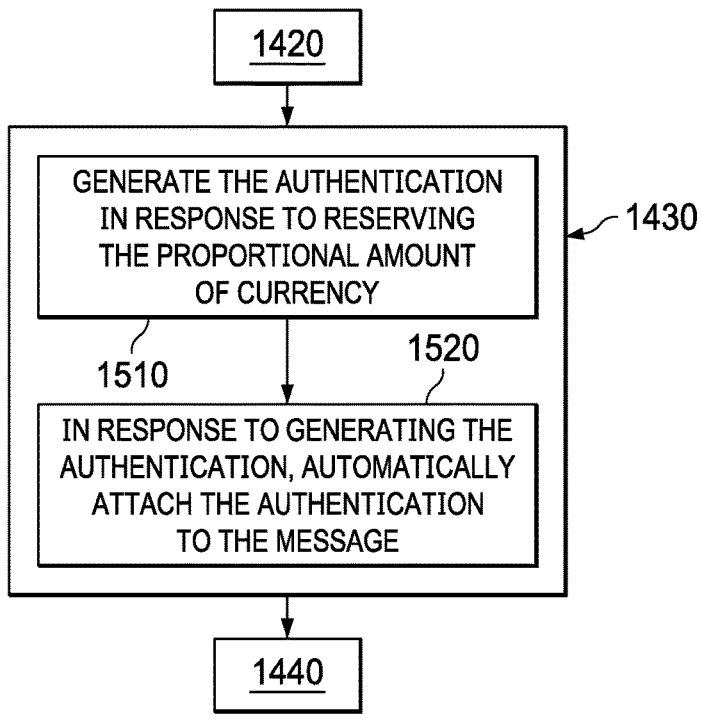
FIG. 15 is an illustration of a flowchart of a process for attaching an authentication of an incentive amount to an electronic message in accordance with an illustrative embodiment.

With reference next to FIG. 15, an illustration of a flowchart of a process for attaching an authentication of an incentive amount to an electronic message is depicted in accordance with an illustrative embodiment. The process of FIG. 15 is a more detailed implementation of process step 1430 of FIG. 14.

In response to process step 1420, the process generates the authentication in response to reserving the proportional amount of currency (step 1510). In response to generating the authentication, the process then automatically attaches the authentication to the e-mail (step 1520), with the process proceeding to process step 1440 of FIG. 14 thereafter.

Figure 16:
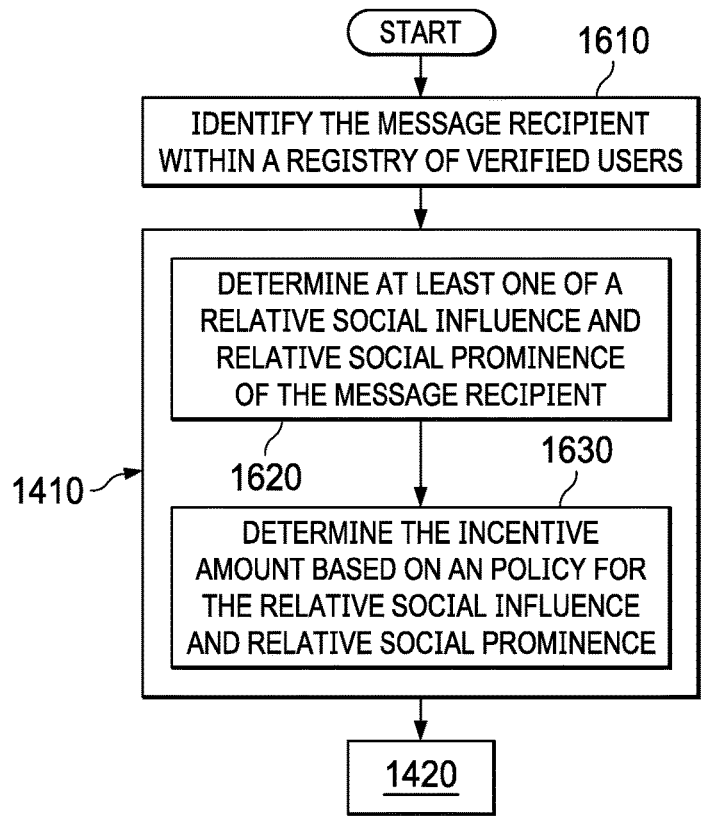
FIG. 16 is an illustration of a flowchart of a process for identifying an incentive amount for an electronic message in accordance with an illustrative embodiment.

With reference next to FIG. 16, an illustration of a flowchart of a process for identifying an incentive amount for an electronic message is depicted in accordance with an illustrative embodiment. The process of FIG. 16 includes a more detailed implementation of process step 1410 of FIG. 14.

The process begins by identifying a message recipient within a registry of verified users (step 1610). The registry can be user registry 308 shown in block form in FIG. 3.

The process then determines at least one of a relative social influence and a relative social prominence of the message recipient (step 1620). In one illustrative example, a relative social influence and a relative social prominence of the message recipient can be determined using one or more rules of social policy 402 of FIG. 4.

The process then determines any incentive amount based on an e-mail policy for the relative social influence and relative social prominence of the message recipient (step 1630), with the process proceeding to process step 1420 thereafter. In one illustrative example, a relative social influence and a relative social prominence of the message recipient can be determined using one or more rules of social policy 402 of FIG. 4.

Figure 17:
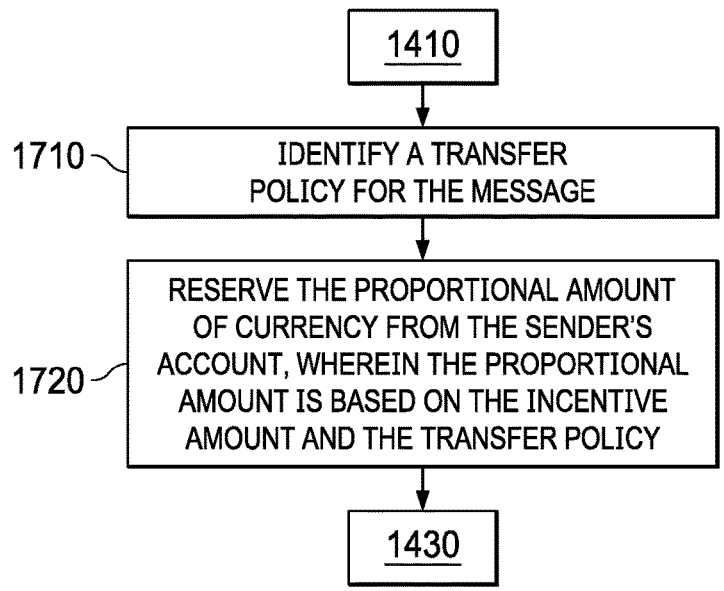
FIG. 17 is an illustration of a flowchart of a process for identifying conditions placed on a performance of actions by a message recipient of an electronic message in accordance with an illustrative embodiment.

FIG. 17 is an illustration of a flowchart of a process for identifying conditions placed on a performance of actions by a message recipient of an electronic message in accordance with an illustrative embodiment. The process of FIG. 17 is a more detailed implementation of process step 1420 of FIG. 14.

In response to the performance of process step 1410 shown in FIG. 14, the process identifies a transfer policy for the electronic message (step 1710). The transfer policy can be transfer policy 406 of FIG. 4.

The process reserves the proportional amount of currency from the sender's account (step 1720). The proportional amount is based on the incentive amount and the transfer policy. The process continues to step 1430 of FIG. 14 thereafter.

Figure 18:
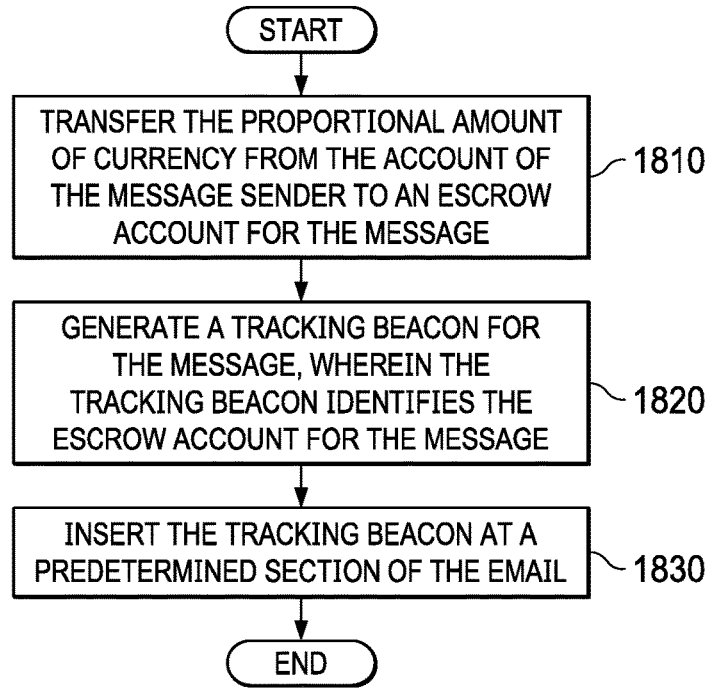
FIG. 18 is an illustration of a flowchart of a process for tracking a user's acceptance of an incentive in accordance with an illustrative embodiment.

FIG. 18 is an illustration of a flowchart of a process for tracking a user's acceptance of an incentive in accordance with an illustrative embodiment. The process begins by transferring the proportional amount of currency from the sender's account to the escrow account (step 1810). The escrow account can be escrow account 336 of payment subsystem 310, both of FIG. 3.

The process then generates a tracking beacon for the electronic message (step 1820). The tracking beacon identifies the escrow account for the electronic message. The tracking beacon can be tracking beacon 502 of FIG. 5.

The process then inserts the tracking beacon at a selected section of the electronic message (step 1830), with the process terminating thereafter. The selected section can be selected section 504 of FIG. 5.

Figure 19:
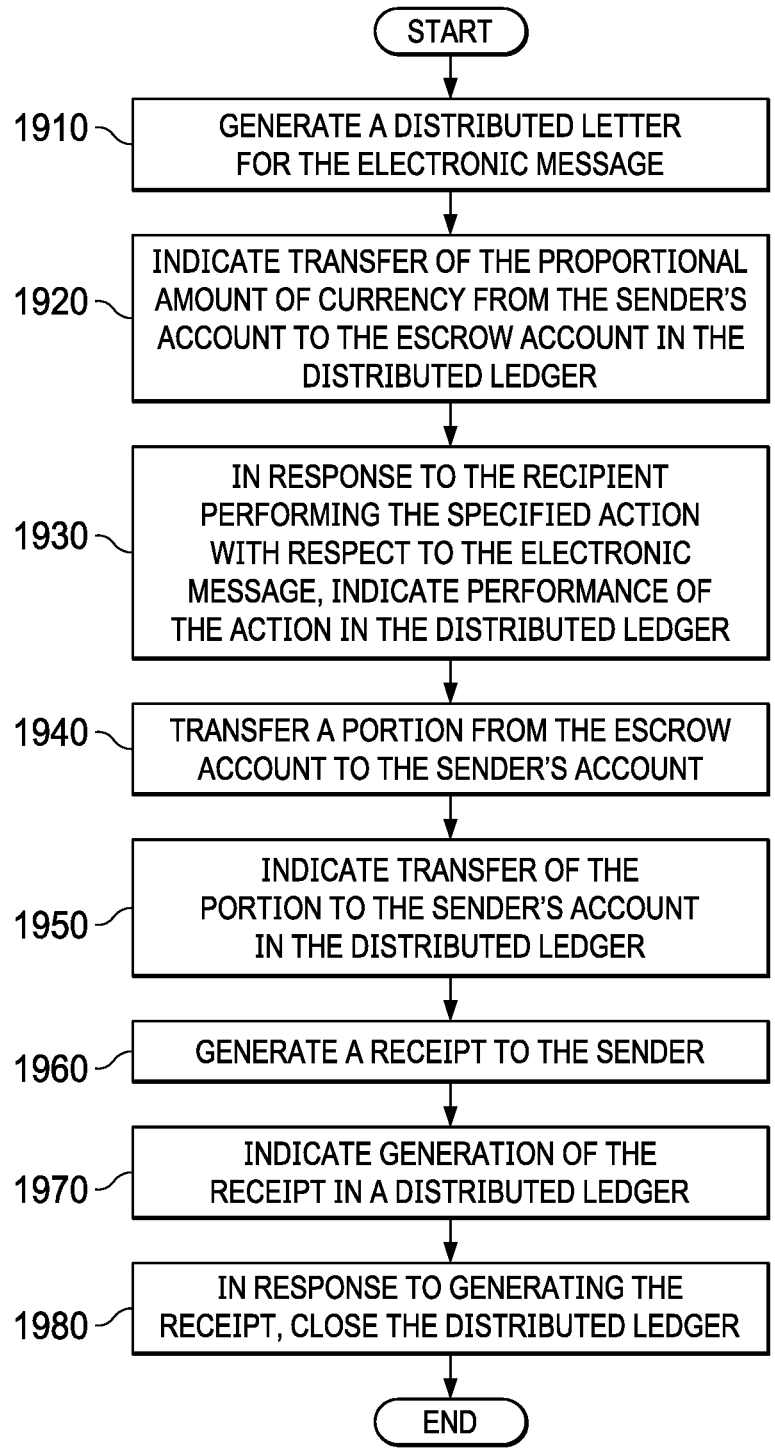
FIG. 19 is an illustration of a flowchart of a process for managing message incentives and tracking a user's acceptance of an incentive in a distributed ledger in accordance with an illustrative embodiment.

FIG. 19 is an illustration of a flowchart of a process for managing message incentives and tracking a user's acceptance of an incentive in a distributed ledger in accordance with an illustrative embodiment. The process of FIG. 19 includes a more detailed implementation of process step 1420 of FIG. 14.

The process begins by generating a distributed ledger for the electronic message (step 1910). The distributed ledger can be distributed ledger 602 of FIG. 6. The process then indicates transfer of the proportional amount of currency from the sender's account to the escrow account in the distributed ledger (step 1920).

In response to the recipient performing a specified action with respect to the electronic message, performance of the action by the recipient is indicated in the distributed ledger for the electronic message (step 1930). The process transfers a portion from the escrow account to the sender's account (step 1940), and indicates the transfer of the portion to the sender's account in the distributed ledger (step 1950).

The process generates a receipt to the sender (step 1960), and indicates generation of the receipt in the distributed ledger (step 1970). In response to generating the receipt, the process closes the distributed ledger (step 1980), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
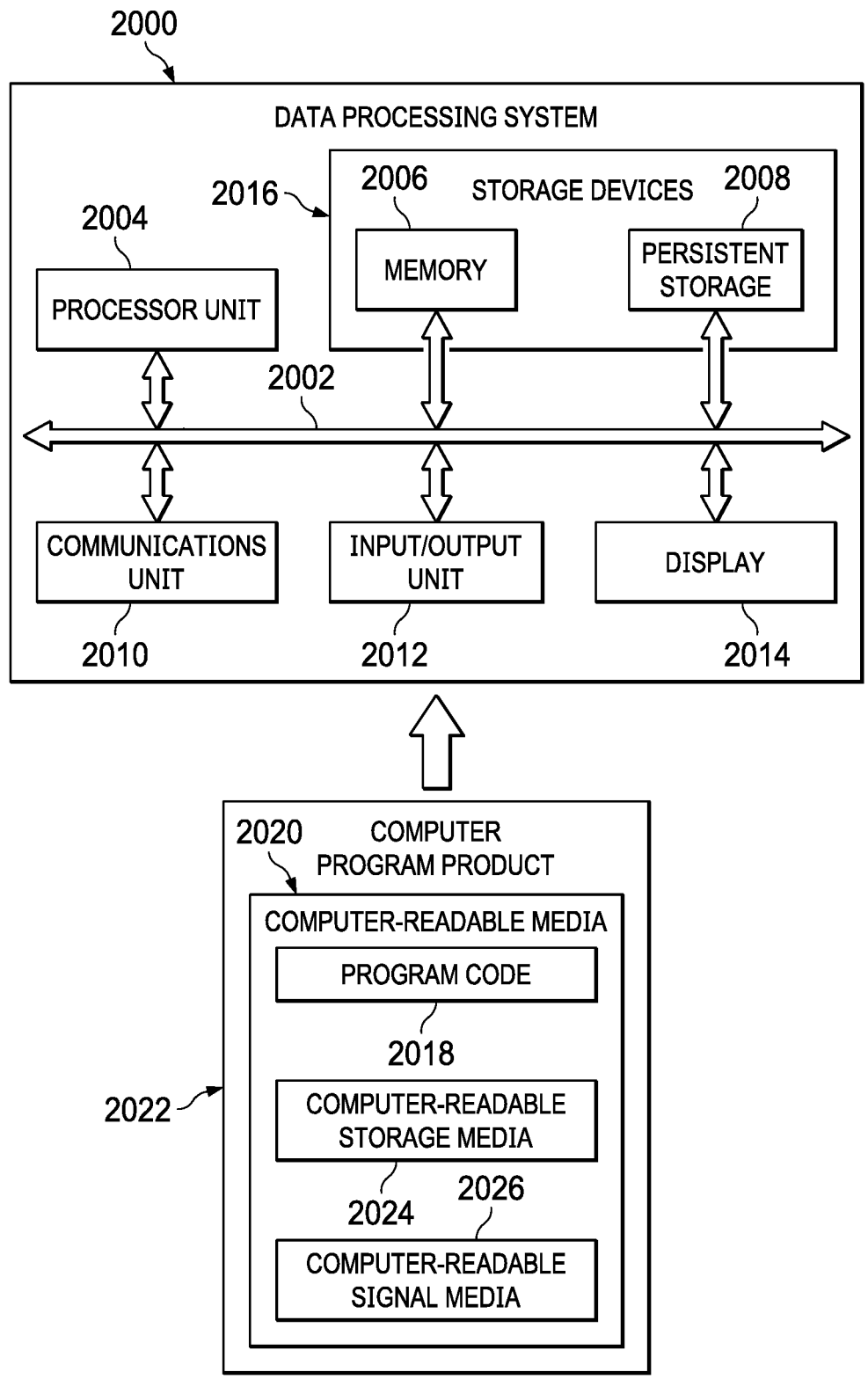
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 may be used to implement one or more computers and computer system 122 in FIG. 1. In this illustrative example, data processing system 2000 includes communications framework 2002, which provides communications between processor unit 2004, memory 2014, persistent storage 2016, communications unit 2008, input/output unit 2010, and display 2012. In this example, communications framework 2002 may take the form of a bus system.

Processor unit 2004 serves to execute instructions for software that may be loaded into memory 2014. Processor unit 2004 may be a number of processors, a multi-processor core, or some other type of processor, depending on the particular implementation.

Memory 2014 and persistent storage 2016 are examples of storage devices 2006. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2006 may also be referred to as computer-readable storage devices in these illustrative examples. Memory 2014, in these examples, may be, for example, a random-access memory or any other suitable volatile or non-volatile storage device. Persistent storage 2016 may take various forms, depending on the particular implementation.

For example, persistent storage 2016 may contain one or more components or devices. For example, persistent storage 2016 may be a hard drive, a flash memory, a rewritable optical disk, a rewritable magnetic tape, or some combination of the above. The media used by persistent storage 2016 also may be removable. For example, a removable hard drive may be used for persistent storage 2016.

Communications unit 2008, in these illustrative examples, provides for communications with other data processing systems or devices. In these illustrative examples, communications unit 2008 is a network interface card.

Input/output unit 2010 allows for input and output of data with other devices that may be connected to data processing system 2000. For example, input/output unit 2010 may provide a connection for user input through at least of a keyboard, a mouse, or some other suitable input device. Further, input/output unit 2010 may send output to a printer. Display 2012 provides a mechanism to display information to a user.

Instructions for at least one of the operating system, applications, or programs may be located in storage devices 2006, which are in communication with processor unit 2004 through communications framework 2002. The processes of the different embodiments may be performed by processor unit 2004 using computer-implemented instructions, which may be located in a memory, such as memory 2014.

These instructions are referred to as program code, computer-usable program code, or computer-readable program code that may be read and executed by a processor in processor unit 2004. The program code in the different embodiments may be embodied on different physical or computer-readable storage media, such as memory 2014 or persistent storage 2016.

Program code 2018 is located in a functional form on computer-readable media 2020 that is selectively removable and may be loaded onto or transferred to data processing system 2000 for execution by processor unit 2004. Program code 2018 and computer-readable media 2020 form computer program product 2022 in these illustrative examples. In one example, computer-readable media 2020 may be computer-readable storage media 2024 or computer-readable signal media 2026.

In these illustrative examples, computer-readable storage media 2024 is a physical or tangible storage device used to store program code 2018 rather than a medium that propagates or transmits program code 2018. Alternatively, program code 2018 may be transferred to data processing system 2000 using computer-readable signal media 2026.

Computer-readable signal media 2026 may be, for example, a propagated data signal containing program code 2018. For example, computer-readable signal media 2026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2000 are not meant to provide architectural limitations to the manner in which different embodiments may be implemented. The different illustrative embodiments may be implemented in a data processing system including components in addition to or in place of those illustrated for data processing system 2000. Other components shown in FIG. 20 can be varied from the illustrative examples shown. The different embodiments may be implemented using any hardware device or system capable of running program code 2018.

Thus, the illustrative embodiments provide a method, apparatus, and computer program product for sending an electronic message using an incentive-based messaging system. Sending an electronic message using an incentive-based messaging system allows the sender to attach a payment incentive with the message. The recipient can view the attached amount before opening the message, which can be prioritized within the message client according to the attached amount. The incentive payment is received only when the recipient performs an action with respect to the message, such as opening or reading the message.

In this manner, the incentive-based messaging system provides a secure alternative to traditional e-mail. The incentive-based messaging system provides storage and encryption of the electronic messages, as well as the user interactions and incentive amounts. The incentive-based messaging system allows micro-payments from a message sender in the form of an incentive, which is held in an escrow account separate from the electronic message. The incentive-based messaging system keeps the incentive amounts separate from the message text to prevent spoofing by the message sender or interception by outside parties. The incentive amounts can be encrypted, together along with any required transaction keys, and provided to the users in the form of a distributed ledger.

In this manner, the use of the incentive-based messaging system has a technical effect of incentivizing an electronic message to overcome a problem that is particular to computer systems, thereby allowing the sender of an electronic message to ensure visibility and penetration of an electronic message to one or more message recipients. In this manner, distributing relevant information to message recipients may be performed more efficiently as compared to currently used systems that do not include the incentive-based messaging system.

As a result, a computer system that includes incentive-based messaging system operates as a special purpose computer system. For example, when the computer system uses the incentive-based messaging system to send an electronic message, the computer system identifies an incentive amount for the electronic message. The computer system reserves a proportional amount of currency from a sender's account. The proportional amount of currency is based on the incentive amount. In response to reserving the proportional amount of currency, the computer system attaches both the incentive amount and an authentication of the incentive amount to the electronic message. The computer system sends the electronic message to a recipient. A portion of the proportional amount of currency is transferred to a recipient's account in response to the recipient performing an action with respect to the electronic message. In response to transferring the portion of the currency to the account of the electronic message recipient, the computer system sends a payment receipt to a sender of the electronic message.

Thus, the incentive-based messaging system transforms a computer system into a special purpose computer system as compared to currently available general computer systems that do not have an incentive-based messaging system, such as incentive-based messaging system 304 of FIG. 3. Currently used general computer systems do not reduce the time or effort needed to distribute relevant information to one or more message recipients and ensure visibility and penetration of the electronic message to the recipients. Further, currently used general computer systems do not provide for an incentive amount for an electronic message based on a policy, such as policy 404 of FIG. 4.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for sending an electronic message comprising:

identifying, using a message client in a computer system, an incentive amount for the electronic message associated with a sender device;

selecting, by the computer system, a proportional amount of currency that is greater than the incentive amount, the proportional amount of currency selected to provide one or more subsequent incentive amounts;

reserving, using an incentive based messaging system in the computer system, the proportional amount of currency from a sender account associated with the sender device;

generating, by the computer system, responsive to reserving the proportional amount of currency, a distributed ledger to indicate possession of the incentive amount;

generating, by the computer system, a digital signature based on application of an encryption protocol to the incentive amount;

identifying, using the message client in the computer system, an authentication of the incentive amount based on the digital signature, wherein the digital signature demonstrates the authenticity of at least the incentive amount, the digital signature signed via the sender device and a payment subsystem of the incentive based messaging system;

in response to reserving the proportional amount of currency, attaching, using the message client in the computer system, both the incentive amount and the authentication of the incentive amount to the electronic message;

sending, using a message server in the computer system, the electronic message to a recipient device;

in response to the recipient device performing an action with respect to the electronic message, transferring, using the incentive based messaging system in the computer system, a portion of the proportional amount of currency to a recipient account;

in response to transferring the portion of the proportional amount of currency to the recipient account, sending, using the message server in the computer system, a payment receipt to the sender device of the electronic message;

in response to transferring the portion of the proportional amount of currency to the recipient account, updating, by the computer system, the distributed ledger to reflect the portion of the proportional amount of currency transferred to the recipient account; and providing, by the computer system, the distributed ledger to the recipient device to cause the recipient device to compare the incentive amount with the digital signature to validate the incentive amount.

2. The method of claim 1, wherein attaching, using the message client in the computer system, the authentication of the incentive amount to the electronic message further comprises:

generating, using the message client in the computer system, the authentication in response to reserving the proportional amount of currency; and in response to generating the authentication, automatically attaching, using the message client in the computer system, the authentication to the electronic message.

3. The method of claim 1, wherein the proportional amount of currency is selected from:
a physical currency;
an electronic currency;
a virtual currency; and
a reward point currency.

4. The method of claim 1, wherein the action comprises at least one of:
opening, via the recipient device, the electronic message;
scrolling, via the recipient device, to a predetermined section of the electronic message;
opening, via the recipient device, an attachment attached to the electronic message; or
forwarding, via the recipient device, the electronic message to a subsequent recipient device.

5. The method of claim 1, further comprising:
identifying, by the computer system, the recipient device within a registry of verified devices, and wherein determining the incentive amount further comprises:
determining at least one of a relative social influence and relative social prominence of a user associated with the recipient device; or
determining the incentive amount based on policy for the relative social influence and relative social prominence.

6. The method of claim 1, further comprising:
identifying, by the computer system, a transfer policy for the electronic message; and
reserving, by the computer system, the proportional amount of currency from the sender account, wherein the proportional amount of currency is based on the incentive amount and the transfer policy;
wherein the transfer policy comprises at least one of:
a policy delineating a total amount currency to be transferred from the sender account;
a policy delineating a number of recipient devices to which the portion of the proportional amount can be transferred;
a policy delineating an amount of time during which the recipient device can perform the action with respect to the electronic message;
a policy indicating whether the action is transferable from the recipient device by forwarding the electronic message to a subsequent recipient; or
a policy indicating a first sub-portion allocated to the recipient device and a second sub-portion allocated to the subsequent recipient device in response to the subsequent recipient device performing a specified action with respect to the electronic message.

7. The method of claim 1, further comprising:
transferring, by the computer system, the proportional amount of currency from the sender account to an escrow account for the electronic message;
generating, by the computer system, a tracking beacon for the electronic message, wherein the tracking beacon identifies the escrow account for the electronic message; and
inserting, by the computer system, the tracking beacon at a predetermined section of the electronic message.

8. The method of claim 1, wherein reserving the proportional amount of currency further comprises:
indicating, by the computer system, the transfer of the proportional amount of currency from the sender account to an escrow account in the distributed ledger.

9. The method of claim 8, further comprising:
in response to the recipient device performing the action with respect to the electronic message, indicating, by the computer system, the action of the recipient device in the distributed ledger;
transferring, by the computer system, the portion of the proportional amount of currency from the escrow account to the recipient account and indicating a transfer of the portion of the proportional amount of currency from the escrow account to the recipient account in the distributed ledger;
generating, by the computer system, the payment receipt to the sender device and indicating generation of the payment receipt in the distributed ledger; and in response to generating the payment receipt, closing, by the computer system, the distributed ledger.

10. A computer system comprising:
a message client in the computer system;
a message server in the computer system, wherein the message server is in communication with the message client; and
an incentive based messaging system in the computer system, wherein the incentive based messaging system is in communication with the message client and the message server, wherein the incentive based messaging system is configured:
to identify, using the message client in the computer system, an incentive amount for an electronic message associated with a sender device;
to select a proportional amount of currency that is greater than the incentive amount, the proportional amount of currency selected to provide one or more subsequent incentive amounts;
to reserve the proportional amount of currency from a sender account;
to generate, responsive to reservation of the proportional amount of currency, a distributed ledger to indicate possession of the incentive amount;
to generate, by the computer system, a digital signature based on application of an encryption protocol to the incentive amount;
to identify, using the message client in the computer system, an authentication of the incentive amount based on the digital signature, wherein the digital signature demonstrates the authenticity of at least the incentive amount, the digital signature signed via the sender device and a payment subsystem of the incentive based messaging system in response to generating a digital signature;
to attach, using the message client in the computer system, both the incentive amount and the authentication of the incentive amount to the electronic message in response to reserving the proportional amount of currency;
to send, using a message server in the computer system, the electronic message to a recipient device;
to transfer a portion of the proportional amount of currency to a recipient account in response to the recipient device performing an action with respect to the electronic message;
to send, using the message server in the computer system, a payment receipt to the sender device of the electronic message in response to transferring the portion of the proportional amount of currency to the recipient account;
to update the distributed ledger to reflect the portion of the proportional amount of currency transferred to the recipient account in response to transferring the portion of the proportional amount of currency to the recipient account; and
to provide, by the computer system, the distributed ledger to the recipient device to cause the recipient device to compare the incentive amount with the digital signature to validate the incentive amount.

11. The computer system of claim 10, wherein attaching the authentication of the incentive amount to the electronic message, the incentive based messaging system is further configured:
to generate, using the message client in the computer system, the authentication in response to reserving the proportional amount of currency; and
to automatically attach, using the message client in the computer system, the authentication to the electronic message in response to generating the authentication.

12. The computer system of claim 10, wherein the proportional amount of currency is selected from:
a physical currency;
an electronic currency;
a virtual currency; and
a reward point currency.

13. The computer system of claim 10, wherein the action comprises at least one of:
opening, via the recipient device, the electronic message;
scrolling, via the recipient device, to a predetermined section of the electronic message;
opening, via the recipient device, an attachment attached to the electronic message; and
forwarding, via the recipient device, the electronic message to a subsequent recipient device.

14. The computer system of claim 10, wherein the incentive based messaging system is further configured:
to identify the recipient device within a registry of verified devices; and
wherein determining the incentive amount, the incentive based messaging system is further configured:
to determine at least one of a relative social influence and relative social prominence of a user associated with the recipient device; or
to determine the incentive amount based on policy for the relative social influence and relative social prominence.

15. The computer system of claim 10, wherein the incentive based messaging system is further configured:
to identify a transfer policy for the electronic message; and
to reserve the proportional amount of currency from the sender account, wherein the proportional amount of currency is based on the incentive amount and the transfer policy;
wherein the transfer policy comprises at least one of:
a policy delineating a total amount currency to be transferred from the sender account;
a policy delineating a number of recipient devices to which the portion of the proportional amount of currency can be transferred;
a policy delineating an amount of time during which the recipient device can perform the action with respect to the electronic message;
a policy indicating whether the action is transferable from the recipient device by forwarding the electronic message to a subsequent recipient device; and
a policy indicating a first sub-portion allocated to the recipient device and a second sub-portion allocated to the subsequent recipient device in response to the subsequent recipient device performing a specified action with respect to the electronic message.

16. The computer system of claim 10, wherein the incentive based messaging system is further configured:
to transfer the proportional amount of currency from the sender account to an escrow account for the electronic message;
to generate a tracking beacon for the electronic message, wherein the tracking beacon identifies the escrow account for the electronic message; and
to insert the tracking beacon at a predetermined section of the electronic message.

17. The computer system of claim 10, wherein in reserving the proportional amount, the incentive-based messaging system is further configured:
to indicate the transfer of the proportional amount from the sender account to an escrow account in the distributed ledger.

18. The computer system of claim 17, wherein the incentive based messaging system is further configured:
to indicate the action of the recipient in the distributed ledger in response to the recipient device performing the action with respect to the electronic message;
to transfer the portion of the proportional amount currency from the escrow account to the recipient account and to indicate a transfer of the portion of the proportional amount from the escrow account to the recipient account in the distributed ledger;
to generate the payment receipt to the to the sender device and to indicate generation of the receipt in the distributed ledger; and
to close the distributed ledger in response to generating the payment receipt.

19. A computer program product for sending an electronic message using an incentive-based messaging system, the computer program product comprising:
a computer readable storage media;
zeroth program code, stored on the computer readable storage media, for identifying, using a message client, an incentive amount for the electronic message associated with a sender device;
first program code, stored on the computer readable storage media, for:
selecting, a proportional amount of currency that is greater than the incentive amount, the proportional amount of currency selected to provide one or more subsequent incentive amounts;
reserving, using the incentive based messaging system, the proportional amount of currency from a sender account associated with the sender device;
generating, responsive to reserving the proportional amount of currency, a distributed ledger to indicate possession of the incentive amount;
generating, by the computer system, a digital signature based on application of an encryption protocol to the incentive amount; and
identifying, using the message client, an authentication of the incentive amount, the authentication including a digital signature demonstrating the authenticity of at least the incentive amount, the digital signature signed via the sender device and a payment subsystem of the incentive based messaging system in response to generating a digital signature;
second program code, stored on the computer readable storage media, for attaching, using the message client, both the incentive amount and the authentication of the incentive amount to the electronic message in response to reserving the proportional amount of currency;
third program code, stored on the computer readable storage media, for:
sending, using a message server, the electronic message to a recipient device; and
transferring, using the incentive based messaging system, a portion of the proportional amount of currency to a recipient account in response to the recipient device performing an action with respect to the electronic message; and
fourth program code, stored on the computer readable storage media, for:
sending, using the message server, a payment receipt to the sender device of the electronic message in response to transferring the portion of the proportional amount of currency to the recipient account;
updating the distributed ledger to reflect the portion of the proportional amount of currency transferred to the recipient account in response to transferring the portion of the proportional amount of currency to the recipient account; and
providing, by the computer system, the distributed ledger to the recipient device to cause the recipient device to compare the incentive amount with the digital signature to validate the incentive amount.

20. The computer program product of claim 19, wherein the second program code further comprises further comprises:
program code for generating, using the message client in the computer system, the authentication in response to reserving the proportional amount of currency; and
program code for automatically attaching, using the message client in the computer system, the authentication to the electronic message in response to generating the authentication.

21. The computer program product of claim 19, wherein the proportional amount of currency is selected from:
a physical currency;
an electronic currency;
a virtual currency; and
a reward point currency.

22. The computer program product of claim 19, wherein the action comprises at least one of:
opening, via the recipient device, the electronic message;
scrolling, via the recipient device, to a predetermined section of the electronic message;
opening, via the recipient device, an attachment attached to the electronic message; or
forwarding, via the recipient device, the electronic message to a subsequent recipient device.

23. The computer program product of claim 19, further comprising:
fifth program code, stored on the computer readable storage media, for identifying the recipient within a registry of verified users, and wherein the first program code further comprises:
program code for determining at least one of a relative social influence and relative social prominence of a user associated with the recipient device; or
program code for determining the incentive amount based on policy for the relative social influence and relative social prominence.

24. The computer program product of claim 19, further comprising:
fifth program code, stored on the computer readable storage media, for identifying a transfer policy for the electronic message; and
sixth program code, stored on the computer readable storage media, for reserving the proportional amount of currency from the sender account, wherein the proportional amount of currency is based on the incentive amount and the transfer policy; and
wherein the transfer policy comprises at least one of:
a policy delineating a total amount currency to be transferred from the sender account;
a policy delineating a number of recipients to which the portion of the proportional amount of currency can be transferred;

a policy delineating an amount of time during which the recipient device can perform the action with respect to the electronic message;

a policy indicating whether the action is transferable from the recipient device by forwarding the electronic message to a subsequent recipient; or a policy indicating a first sub-portion allocated to the recipient device and a second sub-portion allocated to the subsequent recipient device in response to the subsequent recipient performing a specified action with respect to the electronic message.

25. The computer program product of claim 19, further comprising:

fifth program code, stored on the computer readable storage media, for transferring the proportional amount of currency from the sender account to an escrow account for the electronic message;

sixth program code, stored on the computer readable storage media, for generating a tracking beacon for the electronic message, wherein the tracking beacon identifies the escrow account for the electronic message; and seventh program code, stored on the computer readable storage media, for inserting the tracking beacon at a predetermined section of the electronic message.

26. The computer program product of claim 19, wherein the second program code further comprises:

program code for indicating the transfer of the proportional amount from the sender account to an escrow account in the distributed ledger.

27. The computer program product of claim 26, further comprising:

fifth program code, stored on the computer readable storage media, for indicating the action of the recipient device in the distributed ledger in response to the recipient device performing the action with respect to the electronic message;

sixth program code, stored on the computer readable storage media, for transferring the portion of the currency from the escrow account to the recipient account and for indicating a transfer of the portion of the proportional amount of currency from the escrow account to the recipient account in the distributed ledger;

seventh program code, stored on the computer readable storage media, for generating the payment receipt to the sender device and for indicating generation of the payment receipt in the distributed ledger; and eighth program code, stored on the computer readable storage media, for closing the distributed ledger in response to generating the payment receipt.

* * * * *